(12) United States Patent
Hara

(10) Patent No.: US 9,341,830 B2
(45) Date of Patent: May 17, 2016

(54) LENS SYSTEM AND IMAGE PICKUP DEVICE EQUIPPED WITH THE SAME

(75) Inventor: Kento Hara, Shibuya (JP)

(73) Assignee: OLYMPUS CORPORATION, Tokyo (JP)

(*) Notice: Subject to any disclaimer, the term of this patent is extended or adjusted under 35 U.S.C. 154(b) by 1105 days.

(21) Appl. No.: 13/416,602

(22) Filed: Mar. 9, 2012

(65) Prior Publication Data

US 2012/0229913 A1   Sep. 13, 2012

(30) Foreign Application Priority Data

Mar. 10, 2011   (JP) ................... 2011-053057

(51) Int. Cl.
  *G02B 15/14*   (2006.01)
  *G02B 15/173*  (2006.01)

(52) U.S. Cl.
  CPC .................... *G02B 15/173* (2013.01)

(58) Field of Classification Search
  CPC ....................................................... G02B 15/14
  USPC ......................................... 359/676, 683, 684
  See application file for complete search history.

(56) References Cited

U.S. PATENT DOCUMENTS

| 2005/0099699 A1* | 5/2005 | Nurishi ................. G02B 15/17 359/676 |
| 2010/0214658 A1* | 8/2010 | Ito ................................. 359/557 |
| 2011/0194015 A1* | 8/2011 | Kanetaka ..................... 348/345 |

FOREIGN PATENT DOCUMENTS

| JP | 03-278012    | 12/1991 |
| JP | 04-110811    | 4/1992  |
| JP | 09-197261 A  | 7/1997  |
| JP | 11-237544 A  | 8/1999  |
| JP | 2001-264614 A| 9/2001  |
| JP | 2003-329924  | 11/2003 |
| JP | 2008-257200 A| 10/2008 |

OTHER PUBLICATIONS

Japanese Office Action received in Japanese Application No. 2011-053057, dated Nov. 5, 2014.

* cited by examiner

*Primary Examiner* — Scott J Sugarman
(74) *Attorney, Agent, or Firm* — Kenyon & Kenyon LLP

(57) ABSTRACT

A lens system, from an object side to an image side in the following order, at least includes: a fixed object-side lens group that is disposed closest to the object side; a first focusing lens group that moves during a focusing operation and includes a plurality of lenses; a second focusing lens group that moves during a focusing operation and includes a plurality of lenses; a wobbling lens group that has a smaller thickness on an optical axis than the thickness on the optical axis of the first focusing lens group and the thickness on the optical axis of the second focusing lens group, and vibrates in an optical-axis direction; and a fixed image-side lens group that is disposed closest to the image side.

23 Claims, 16 Drawing Sheets

Example 1
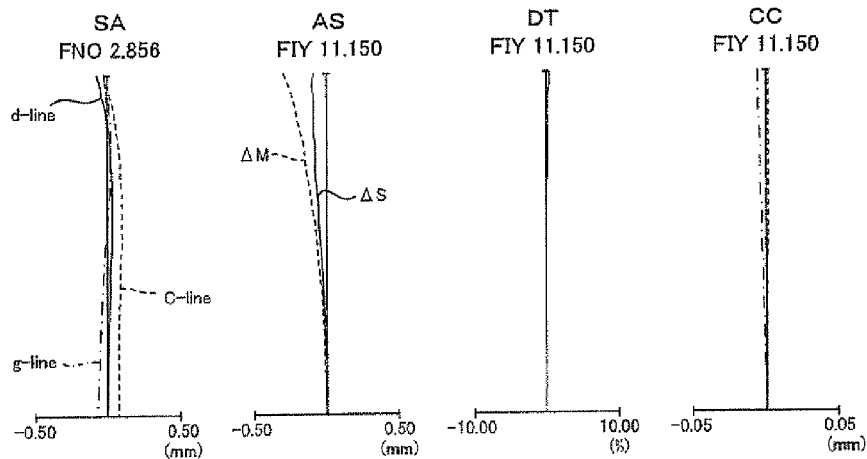
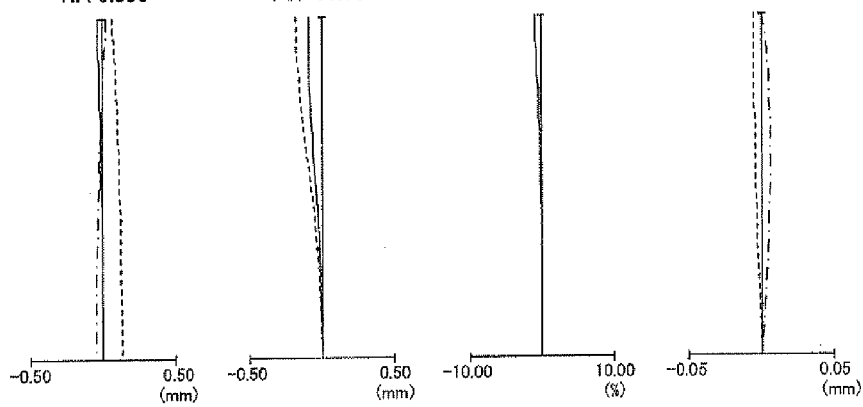
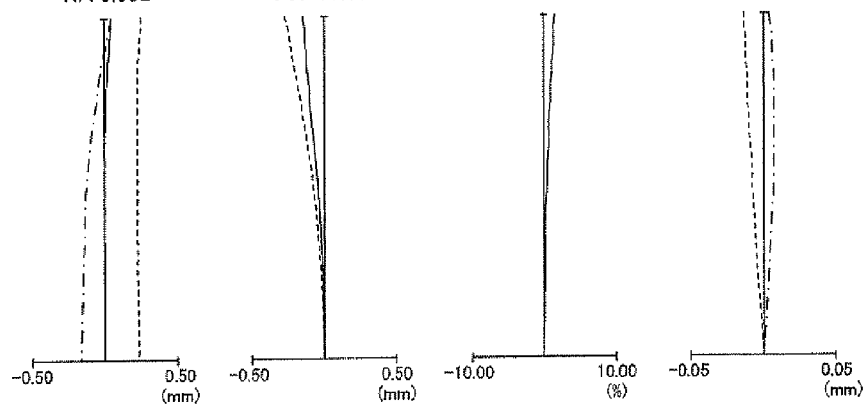

Example 2

SA
FNO 2.856

AS
FIY 11.150

DT
FIY 11.150

CC
FIY 11.150

SA
NA 0.054

AS
FIY 11.150

DT
FIY 11.150

CC
FIY 11.150

SA
NA 0.087

AS
FIY 11.150

DT
FIY 11.150

CC
FIY 11.150

Example3

SA
FNO 2.856

AS
FIY 11.150

DT
FIY 11.150

CC
FIY 11.150

SA
NA 0.052

AS
FIY 11.150

DT
FIY 11.150

CC
FIY 11.150

SA
NA 0.079

AS
FIY 11.150

DT
FIY 11.150

CC
FIY 11.150

Example 4

SA
FNO 2.856

AS
FIY 11.150

DT
FIY 11.150

CC
FIY 11.150

SA
NA 0.049

AS
FIY 11.150

DT
FIY 11.150

CC
FIY 11.150

SA
NA 0.075

AS
FIY 11.150

DT
FIY 11.150

CC
FIY 11.150

Example5

SA
FNO 2.856

AS
FIY 11.150

DT
FIY 11.150

CC
FIY 11.150

SA
NA 0.051

AS
FIY 11.150

DT
FIY 11.150

CC
FIY 11.150

SA
NA 0.078

AS
FIY 11.150

DT
FIY 11.150

CC
FIY 11.150

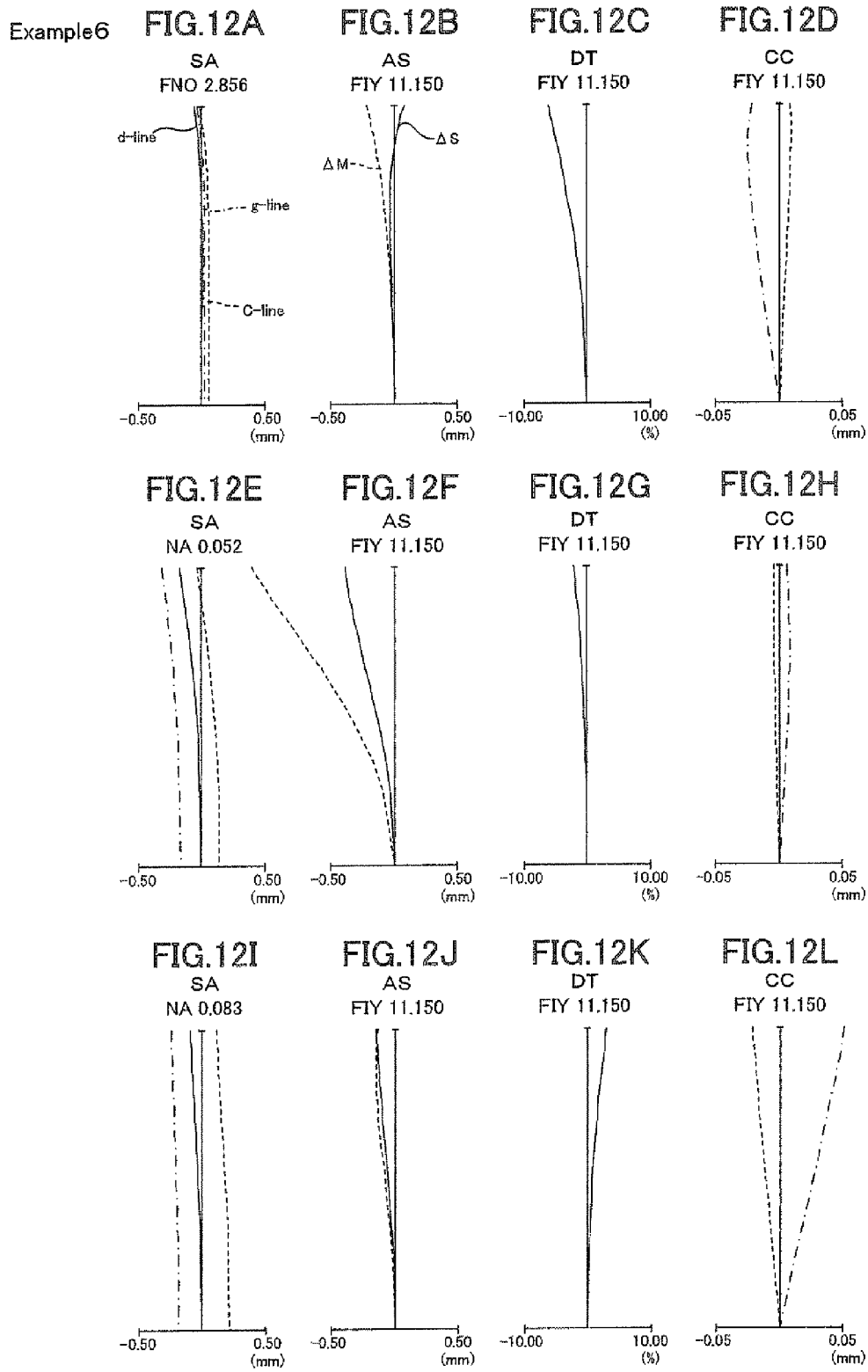

LENS SYSTEM AND IMAGE PICKUP DEVICE EQUIPPED WITH THE SAME

This application claims benefit of Japanese Application No. 2011-053057 filed in Japan on Mar. 10, 2011, the contents of which are incorporated by this reference.

BACKGROUND OF THE INVENTION

The present invention relates to a lens system of an inner focus type that can be focused at short range. Furthermore, the present invention relates to an image pickup device equipped with a lens system of an inner focus type that can be focused at short range.

Conventionally, a lens system of an inner focus type capable of being focused at short range by disposing a plurality of focus-lens groups inside the lens system has been known in, for example, JP-A-3-278012, JP-A-4-110811 and JP-A-2003-329924. Such a configuration realizes a lens system that makes it difficult for dust to get into the lens system and for a lens to collide with an object even during a focusing operation.

Meanwhile, in recent years, instead of a conventional focus detection method of a phase difference method, a focusing type has been increasingly used; according to the focusing type, a change in contrast at a time when a lens group is transferred is read, and a focus state comes when the contrast approaches a maximum. Such a focusing type makes it unnecessary to dispose a reflection surface between a lens system and an image pickup plane. Therefore, in a constant volume inside the lens system when used. Therefore, the above configuration is favorable to keeping dust or water from getting into and reducing the noise that occurs as the lens groups move.

Moreover, a plurality of lens groups move to carryout inner focusing. Therefore, as the refractive power of the focusing lens groups increases, the above configuration becomes favorable to reducing the traveling distance of the focusing lens groups shifting from focused-at-infinity mode to focused-at-close-range mode.

Meanwhile, as the refractive power of the lens groups increases, a change in aberration and the like are more likely to occur when the lens groups move. In order to suppress the above, the first focusing lens group and the second focusing lens group are each made up of a plurality of lenses.

Moreover, the lens group that performs a wobbling operation is provided separately from the first focusing lens group and the second focusing lens group, and is formed so as to have a small thickness on the optical axis.

The above configuration makes lighter the lens group that performs the wobbling operation, and is favorable to increasing the speed of focusing control and saving energy.

It is preferred that the above invention satisfy one or a plurality of the following configurations at the same time.

Moreover, it is preferred that the following conditional expression (1) be satisfied:

$$0.03 < Dwob/(DF1+DF2) < 0.15 \qquad (1)$$

where

Dwob is the thickness on the optical axis of the wobbling the focusing type is advantageous to making the entire device smaller when the lens system is incorporated.

Moreover, in recent years, the following lens system has been also known: the lens system with a higher auto-focusing speed, which is so formed as to cause some lenses of the lens system to slightly vibrate, or wobble, in an optical-axis direction and determine a movement direction of a focusing lens group on the basis of a change in contrast on an image pickup plane.

SUMMARY OF THE INVENTION

It is preferred that a lens system, from an object side to an image side in the following order, at least include:

an object-side lens group that is fixed closest to the object side;

a first focusing lens group that moves during a focusing operation and includes a plurality of lenses;

a second focusing lens group that moves during a focusing operation and includes a plurality of lenses;

a wobbling lens group that has a smaller thickness on an optical axis than the thickness on the optical axis of the first focusing lens group and the thickness on the optical axis of the second focusing lens group, and vibrates in an optical-axis direction; and an image-side lens group that is fixed closest to the image side.

In that manner, the lens group closest to the object side and the lens group closest to the image side are fixed, resulting lens group, DF1 is the thickness on the optical axis of the first focusing lens group, and DF2 is the thickness on the optical axis of the second focusing lens group.

Since the value does not exceed the upper limit of the conditional expression (1), the above configuration is favorable to making the wobbling lens group lighter, as well as to downsizing by ensuring the refractive power of the first focusing lens group and the second focusing lens group.

The value does not go below the lower limit of the conditional expression (1), ensuring the thickness of the wobbling lens group. Therefore, the above configuration is preferred in terms of durability.

Moreover, it is preferred that the object-side lens group have positive refractive power, the first focusing lens group have negative refractive power, the second focusing lens group have positive refractive power, and the following conditional expressions (2) and (3) be satisfied:

$$-0.78 < fF1/fobj < -0.4 \qquad (2)$$

$$-1.3 < fF1/fF2 < -0.80 \qquad (3)$$

where fobj is a focal distance of the object-side lens group, fF1 is a focal distance of the first focusing lens group, and fF2 is a focal distance of the second focusing lens group.

In the conditional expression (2), a preferable focal distance ratio of the object-side lens group and the first focusing lens group is specified.

The refractive power of the object-side lens group is curbed relative to the refractive power of the first focusing lens group in such a way that the value does not go below the lower limit of the conditional expression (2). Therefore, the above configuration is favorable to reducing the spherical aberration occurring on the object-side lens group.

The refractive power of the first focusing lens group is curbed relative to the refractive power of the object-side lens group in such a way that the value does not go above the upper limit of the conditional expression (2). Therefore, the above configuration makes it possible to reduce excessive divergence of a light beam emitted from the first focusing lens group, making smaller and lighter the lens groups that are positioned behind the first focusing lens group.

In the conditional expression (3), a preferable focal distance ratio of the first focusing lens group and the second focusing lens group is specified.

The refractive power of the first focusing lens group and the refractive power of the second focusing lens group are balanced in such a way that the value does not go below the lower limit of the conditional expression (3) and above the upper limit, thereby reducing an excess burden on the changing of the magnification of one of the focusing lens groups and ensuring optical performance from a focused-at-long-range period to a focused-at-short-range period.

Moreover, it is preferred that the following conditional expressions (4) and (5) be satisfied:

$$|(100\times(y1'-y1)/y1)|<0.107 \quad (4)$$

$$|(100\times(y0.7'-y0.7)/y0.7)|<0.107 \quad (5)$$

where y1 is a maximum height of image on an image plane, y0.7 is 0.7 times the maximum height of image y1, y1' is a light-beam height at a location where a main light beam having the same angle of view as an image-taking angle of view, which extends to the image height y1 during a focused-at-infinity period, cross the image plane at a time when a defocus amount of Δs has occurred since the focused-at-infinity period as the wobbling lens group moves relative to an object at infinity, y0.7' is a light-beam height at a location where a main light beam having the same angle of view as an image-taking angle of view, which extends to the image height y0.7 during a focused-at-infinity period, cross the image plane at a time when a defocus amount of Δs has occurred since the focused-at-infinity period as the wobbling lens group moves relative to an object at infinity, Δs is 8 * the maximum height of image y1/1000, and y1, y0.7, y1', y0.7' and Δs are all measured in millimeters.

It is preferred that during a wobbling operation, a change in the image magnification be decreased. The amount of change in the image magnification varies according to the height of the image. However, only a specific image height is not sufficient. It is preferred that the amount of change be decreased across the entire screen. The conditional expressions (4) and (5) are conditional expressions for decreasing the amount of change across the entire screen, and define preferable conditions for the amount of change in the image magnification relative to the defocus amount. Incidentally, there is a difference depending on the value of defocus amount Δs. However, in this case, calculation is performed with the defocus amount corresponding to an allowable depth. In general, the allowable depth can be represented as follows: an F-number * an allowable diameter of a circle of confusion. According to the present embodiment, the F-number is equal to 8, and the allowable diameter of the circle of confusion is equal to the maximum height of image (y1)/1000.

In order to decrease the amount of change across the entire screen, it is preferred to satisfy both the conditional expressions (4) and (5), rather than satisfying either the conditional expression (4) or (5).

When the conditional expressions (4) and (5) are both satisfied, it is possible to keep the image-magnification change low even under an image-taking state of any other image height or finite-distance object.

Moreover, it is preferred that the object-side lens group have positive refractive power, the first focusing lens group have negative refractive power, the second focusing lens group have positive refractive power, the wobbling lens group have negative refractive power, a lateral magnification in the wobbling lens group be greater than 1, and the following conditional expressions (6), (7) and (8) be satisfied:

$$0.48<fobj/finf<0.8 \quad (6)$$

$$0.4<fF2/finf<0.5 \quad (7)$$

$$0.2<|fwob|/finf<2.5 \quad (8)$$

where fobj is a focal distance of the object-side lens group, fF2 is a focal distance of the second focusing lens group, fwob is a focal distance of the wobbling lens group, and finf is a focal distance of the lens system during a focused-at-infinity period.

The focusing lens group having negative refractive power and the focusing lens group having positive refractive power are included in the lens system. Therefore, it becomes easier to allow a change in image-formation magnification, as well as to increase the absolute value of a maximum image-formation magnification.

The wobbling lens group is a lens group having negative refractive power, and the lateral magnification is greater than 1. Therefore, it becomes easier to increase the focus sensitivity (the traveling distance of an image-formation plane relative to the traveling distance of the wobbling lens group) Moreover, the above configuration is favorable to reducing a vibration range.

In the conditional expression (6), a preferable refractive power of the object-side lens group is specified.

The positive refractive power is moderately curbed in such a way that the value does not go below the lower limit of the conditional expression (6). Therefore, the above configuration is favorable to reducing a change in the aberration during a focusing operation.

The positive refractive power is ensured in such a way that the value does not go above the upper limit of the conditional expression (6). Therefore, the above configuration is favorable to downsizing and increasing the maximum image-formation magnification.

In the conditional expression (7), a preferable refractive power of the second focusing lens group is specified.

The positive refractive power is moderately curbed in such a way that the value does not go below the lower limit of the conditional expression (7). Therefore, the above configuration is favorable to suppressing a change in aberration during a focusing operation.

The positive refractive power is ensured in such a way that the value does not go above the upper limit of the conditional expression (7). Therefore, the above configuration is favorable to downsizing and increasing the maximum image-formation magnification.

In the conditional expression (8), a preferable refractive power of the wobbling lens group is specified.

The negative refractive power is moderately curbed in such a way that the value does not go below the lower limit of the conditional expression (8). Therefore, the above configuration is favorable to reducing an excess of focus sensitivity (the traveling distance of the image-formation plane relative to the traveling distance of the wobbling lens group), as well as to weight saving.

The negative refractive power is ensured in such a way that the value does not go above the upper limit of the conditional expression (8). Therefore, it is possible to decrease a traveling range of a vibration direction during a wobbling operation.

Moreover, it is preferred that the object-side lens group have positive refractive power, and contain three positive lenses and one negative lens.

The sufficient positive refractive power can be ensured with the aberration of the object-side lens group being suppressed. The above configuration is favorable to reducing a change in the aberration from a focused-at-infinity period to a focused-at-close-range period.

Moreover, it is preferred that the image-side lens group be made up of a single lens having positive refractive power.

It is possible to allow the image-side lens group to have a function of moving an exit pupil away from the image plane while keeping the total length and the back focus short. Since the lens group is made up of a single lens, the above configuration is favorable to weight saving.

Moreover, it is preferred that there be only two fixed lens groups, which are the object-side lens group and the image-side lens group.

The above configuration is favorable to ensuring a traveling distance of a lens group that moves during a focusing operation.

Moreover, it is preferred that the first focusing lens group have negative refractive power, and be made up of three lenses, which are one positive lens and two negative lenses.

It becomes easier to ensure the refractive power of the first focusing lens group and reduce the aberration. The above configuration is favorable to curbing a change in the aberration during a focusing operation.

Moreover, it is preferred that the second focusing lens group have positive refractive power, and be made up of three lenses, which are two positive lenses and one negative lens.

It becomes easier to ensure the refractive power of the second focusing lens group and reduce the aberration. The above configuration is favorable to curbing a change in the aberration during a focusing operation. If the number of lenses is further reduced, a change in the aberration is more likely to occur during a focusing operation. If there are a large number of lenses, the configuration is unfavorable to downsizing and reducing noise during a focusing operation.

Moreover, it is preferred that the wobbling lens group be made up of a single lens having negative refractive power.

The above configuration is favorable to weight saving, as well as to ensuring the focus sensitivity.

Moreover, it is preferred that the object-side lens group have positive refractive power, the first focusing lens group have negative refractive power, the second focusing lens group have positive refractive power, the wobbling lens group have negative refractive power, the image-side lens group have positive refractive power, the second focusing lens group be disposed closer to the image side than the first focusing lens group, the wobbling lens group be disposed closer to the image side than the second focusing lens group, an aperture diaphragm be disposed between the first focusing lens group and the second focusing lens group, and when focusing is carried out from a remote distance to a short distance, the first focusing lens group move to the image side, and the second focusing lens group to the object side.

The first focusing lens group and the second focusing lens group are used to cancel changes in various aberrations. Therefore, it becomes easier to provide a multiplication function during a focused-at-short-range operation period while maintaining the performance. Since the wobbling lens group is placed at the above position, it becomes easier to reduce a change in the image magnification associated with the movement of the wobbling lens group while ensuring the focus sensitivity. Since the image-side lens group is provided with positive refractive power, it is possible to decrease the diameter of the wobbling lens group, as well as to make the wobbling lens group lighter. Furthermore, it is possible to move an exit pupil away from the image plane while keeping the total length and the back focus short.

Moreover, it is preferred that the lens system substantially include, from the object side in the following order, the object-side lens group, the first focusing lens group, the second focusing lens group, the wobbling lens group, and the image-side lens group.

It becomes easier to ensure the traveling ranges of the first focusing lens group and the second focusing lens group. Furthermore, the above configuration is favorable to cutting costs and downsizing.

Moreover, it is preferred that the position of the aperture diaphragm be fixed between the first focusing lens group and the second focusing lens group, and the following conditional expression (9) be satisfied:

$$0.2<|M1f|/|M2F|<2.0 \tag{9}$$

where

M1F is a maximum traveling distance of the first focusing lens group, and

M2F is a maximum traveling distance of the second focusing lens group.

The traveling distances of the focusing lens groups are well balanced in a way that satisfies the conditional expression (9). Therefore, it becomes easier to suppress a change in the aberration associated with focusing. Furthermore, the above configuration is favorable to downsizing the lens system.

The traveling distance of the second focusing lens group is decreased in such a way that the value does not go below the lower limit of the conditional expression (9). Therefore, the downsizing of the radial direction of the image-side lens group is achieved rather than the aperture diaphragm.

The traveling distance of the first focusing lens group is decreased in such a way that the value does not go above the upper limit of the conditional expression (9). Therefore, the downsizing of the radial direction of the object-side lens group is achieved rather than the aperture diaphragm.

Moreover, it is preferred that the following conditional expression (10) be satisfied:

$$0.003<|Mwob|/(M1F+M2F|)<0.1 \tag{10}$$

where

M1F is a maximum traveling distance of the first focusing lens group,

M2F is a maximum traveling distance of the second focusing lens group, and

Mwob is a maximum traveling distance of the wobbling lens group.

In the conditional expression (10), a preferable traveling distance of the wobbling lens group is specified.

It is preferred that a wobbling operation be carried out in such a way that the value does not go below the lower limit of the conditional expression (10).

It is preferred to moderately suppress the traveling distances in such a way that the value does not go above the upper limit of the conditional expression (10). The reason is that a mechanical mechanism can be simplified.

Incidentally, in addition to a wobbling operation period, the wobbling lens group may move in an optical-axis direction as a focusing lens group.

Moreover, it is preferred that the following conditional expression (11) be satisfied:

$$0.09<Lbf/Ltotal<0.2 \tag{11}$$

where

Lbf is a distance on an optical axis from a lens surface closest to the image side to the image plane in air of the lens system, Ltotal is Llens+Lbf, and Llens is a distance on the optical axis from a lens surface closest to the object side to a lens surface closest to the image side in the lens system.

The back focus is ensured in such a way that the value does not go below the lower limit of the conditional expression (11). Therefore, a portion in which a lens is placed can be made smaller in size. For example, in the case of an interchangeable lens device that enables an optical system to be mounted onto a camera body, the above configuration is favorable to downsizing.

The back focus is shortened in such a way that the value does not go above the upper limit of the conditional expression (11). Therefore, the above configuration is favorable to downsizing the entire image pickup device including the optical system, and the portability thereof becomes improved. For example, when the present invention is used as an interchangeable lens of a type that is mounted on a camera body having no quick return mirror, the above configuration is suitable for downsizing and improving performance.

Moreover, it is preferred that the focus driving of the wobbling lens group be not performed at the time of focusing, and only the wobbling of the wobbling lens group be carried out.

A focusing task is carried out only by the first focusing lens group and the second focusing lens group. Therefore, it is possible to make the operating range of the wobbling lens group narrower, as well as to easily drive. In addition, the above configuration is also favorable to downsizing the total length of the lenses.

Moreover, it is preferred that during the focusing operation, the first focusing lens group and the second focusing lens group move in such a way that a focus state approaches a peak, and the wobbling lens group then move in away that further approaches the peak of the focus state.

The above configuration helps to improve the focusing accuracy.

Moreover, it is preferred that a movement pitch of the image plane associated with the movement of the wobbling lens group be smaller than a movement pitch of the image plane associated with the movement of the first focusing lens group, and smaller than a movement pitch of the image plane associated with the movement of the second focusing lens group.

The driving pitch of the focusing lens group is made rougher. As a result, it is possible to increase the focusing speed. After rough focusing is carried out by the focusing lens group having a rough pitch, it is possible to further approach the peak of the focus state as the wobbling group moves. Therefore, it is possible to increase the focusing speed, as well as to improve the accuracy at the same time.

Moreover, it is preferred that the image-side lens group be made of one cemented lens.

Since the image-side lens group is one cemented lens, the above configuration is favorable to reducing off-axis chromatic aberration.

Moreover, it is preferred that the image-side lens group be made of one lens.

Since the image-side lens group is one lens, the above configuration is favorable to downsizing.

Moreover, it is preferred to include the lens system that can be focused at short range, and an image pickup device main unit that is disposed on an image side of the lens system and includes an image pickup element having an image pickup plane, which receives the light of an image from the lens system, wherein the lens system satisfies the following conditional expression (12):

$$0.3 \leq |\beta max| \leq 1.7 \quad (12)$$

where $\beta max$ is a maximum lateral magnification of the lens system that can be focused at short range.

The maximum lateral magnification (absolute value) is ensured in such a way that the value does not go below the lower limit of the conditional expression (12). Therefore, the above configuration is preferred because a degree of freedom of an image-taking range can be ensured at the time of macro photography.

The maximum lateral magnification (absolute value) is curbed in such a way that the value does not go above the upper limit of the conditional expression (12). Therefore, it becomes easier to decrease the total length of the lens system.

Each of the conditional expressions is preferably set in the following manner, so that the advantageous effects thereof can be more reliably ensured.

As for the conditional expression (1), the lower limit is preferably 0.04, or more preferably 0.05. The upper limit is preferably 0.12, or more preferably 0.09.

As for the conditional expression (2), the lower limit is preferably −0.75, or more preferably −0.73. The upper limit is preferably −0.5, or more preferably −0.55.

As for the conditional expression (3), the lower limit is preferably −1.1, or more preferably −1.0. The upper limit is preferably −0.82, or more preferably −0.85.

As for the conditional expression (4), the upper limit is preferably 0.0892, or more preferably 0.0624.

As for the conditional expression (5), the upper limit is preferably 0.0892, or more preferably 0.0624.

As for the conditional expression (6), the lower limit is preferably 0.50, or more preferably 0.53. The upper limit is preferably 0.70, or more preferably 0.65.

As for the conditional expression (7), the lower limit is preferably 0.41. The upper limit is preferably 0.48.

As for the conditional expression (8), the lower limit is preferably 0.3, or more preferably 0.4. The upper limit is preferably 1.4, or more preferably 1.2.

As for the conditional expression (9), the lower limit is preferably 0.3, or more preferably 0.4. The upper limit is preferably 0.9, or more preferably 0.8.

As for the conditional expression (10), the lower limit is preferably 0.005, or more preferably 0.015. The upper limit is preferably 0.05, or more preferably 0.03.

As for the conditional expression (11), the lower limit is preferably 0.12, or more preferably 0.14. The upper limit is preferably 0.185, or more preferably 0.165.

As for the conditional expression (12), the lower limit is preferably 0.4, or more preferably 0.5. The upper limit is preferably 1.4, or more preferably 1.2.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 7 is an aberration diagram of the lens system of Example 1;

FIG. 12 is an aberration diagram of the lens system of Example 6;

DESCRIPTION OF EXEMPLARY EMBODIMENTS

Each of the examples described below is used for an interchangeable lens mounted on a camera main unit having no quick return mirror, and is of a lens system of an inner focus type capable of taking a moving image. Needless to say, each of the examples may be used for an interchangeable lens of a single lens reflex camera.

Inner-focus-type lens systems of Examples 1 to 6 of the present invention will be described with reference to the accompanying drawings. FIGS. 1 to 6 are cross-sectional views of the lens systems of Examples 1 to 6 of the present invention expanded and taken along optical axes. In each diagram, (a) the lateral magnification is zero (during a focused-at-infinity period); (b) the lateral magnification is −0.5; and (c) the lateral magnification is −1.0.

Figure 1A:
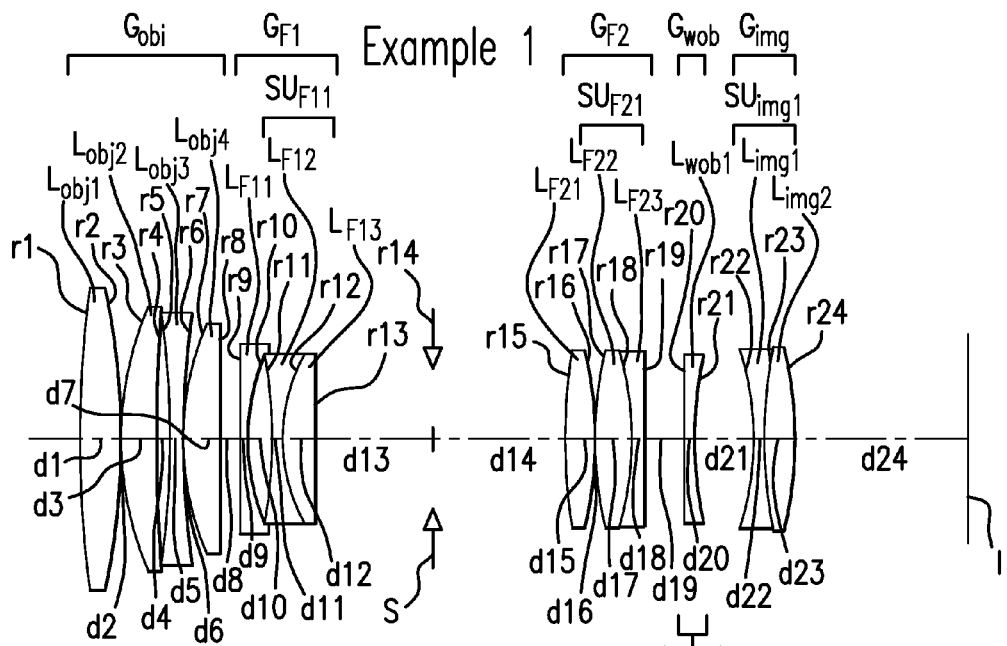
FIG. 1 is a cross-sectional view of a lens system of Example 1 expanded and taken along an optical axis.
Figure 1B:
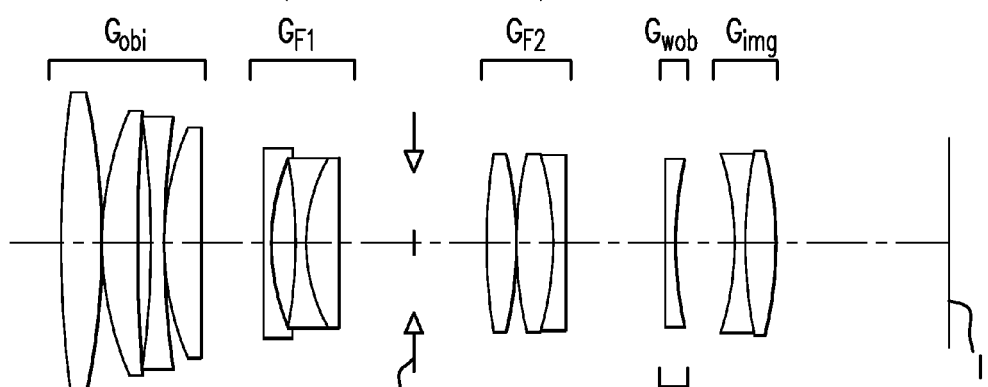
Figure 1C:
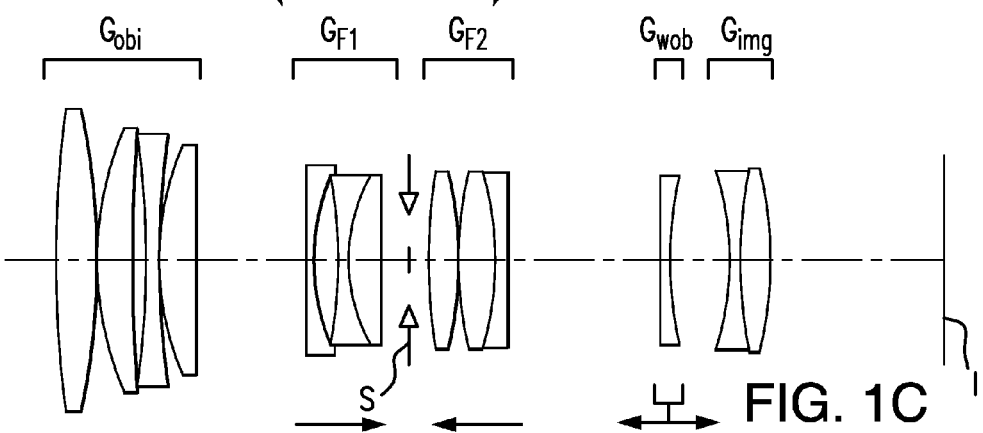

FIG. 1 shows cross-sectional views of a lens system of Example 1.

As shown in the diagram, the lens system of Example 1 includes, from an object side to an image side, an object-side lens group $G_{obj}$ having positive refractive power, a first focusing lens group $F_{F1}$ having negative refractive power, a second focusing lens group $G_{F2}$ having positive refractive power, a wobbling lens group $G_{wob}$ having negative refractive power, and an image-side lens group $G_{img}$ having negative refractive power, in that order. In the diagram, "S" denotes an aperture diaphragm, and "I" an image plane.

The object-side lens group $G_{obj}$ includes, from the object side to the image side, a biconvex positive lens $L_{obj1}$, a positive meniscus lens $L_{obj2}$ whose convex surface faces the object side, a biconcave negative lens $L_{obj3}$, and a plano-convex positive lens $L_{obje4}$ whose convex surface faces the object side, in that order.

The first focusing lens group $G_{F1}$ includes, from the object side to the image side, a negative meniscus lens $L_{F11}$ whose convex surface faces the object side, and a cemented lens $SU_{F11}$, which is made up of a biconcave negative lens $L_{F12}$ and a plano-convex positive lens $L_{F13}$ whose convex surface faces the object side, in that order.

The second focusing lens group $G_{F2}$ includes, from the object side to the image side, a biconvex positive lens $L_{F21}$ and a cemented lens $SU_{F21}$, which is made up of a biconvex positive lens $L_{F22}$ and a biconcave negative lens $L_{F23}$ in that order.

The wobbling lens group $G_{wob}$ includes one biconcave negative lens $L_{wob1}$.

The image-side lens group $G_{img}$ includes a cemented lens $SU_{img1}$, which is made up of a biconcave negative lens $L_{img1}$ and a biconvex positive lens $L_{img2}$.

Figure 2A:
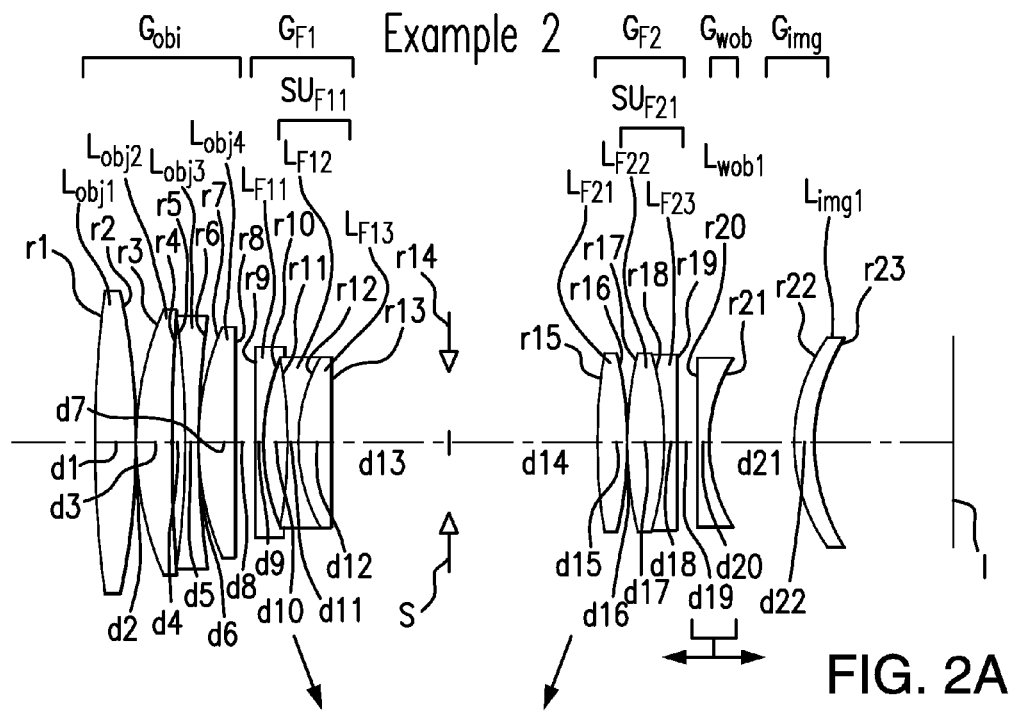
FIG. 2 is a cross-sectional view of a lens system of Example 2 expanded and taken along an optical axis.
Figure 2B:
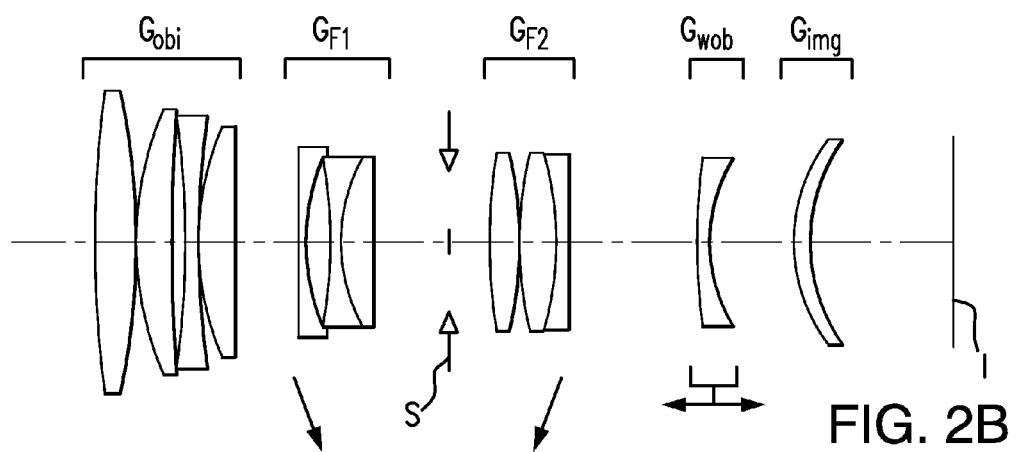
Figure 2C:
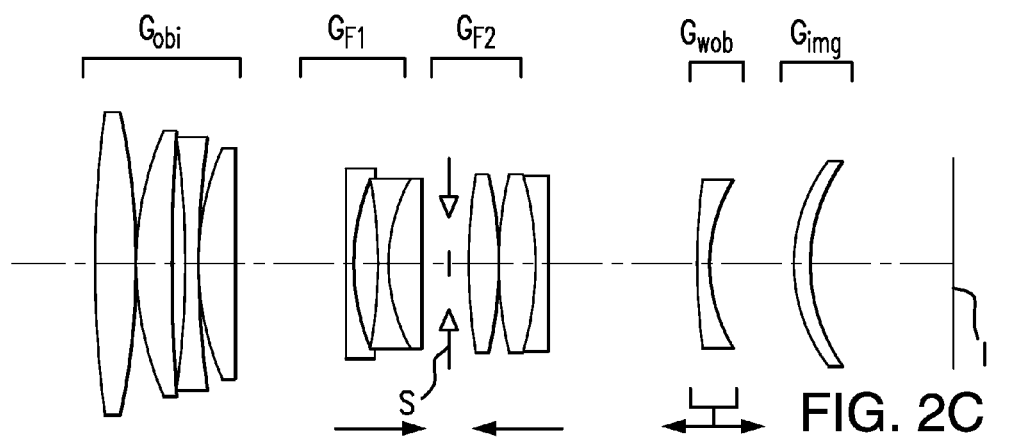

FIG. 2 shows cross-sectional views of a lens system of Example 2.

As shown in the diagram, the lens system of Example 2 includes, from an object side to an image side, an object-side lens group $G_{obj}$ having positive refractive power, a first focusing lens group $G_{F1}$ having negative refractive power, a second focusing lens group $G_{F2}$ having positive refractive power, a wobbling lens group $G_{wob}$ having negative refractive power, and an image-side lens group $G_{img}$ having positive refractive power, in that order. In the diagram, "S" denotes an aperture diaphragm, and "I" an image plane.

The object-side lens group $G_{obj}$ includes, from the object side to the image side, a biconvex positive lens $L_{obj1}$, a positive meniscus lens $L_{obj2}$ whose convex surface faces the object side, a biconcave negative lens $L_{obj3}$, and a positive meniscus lens $L_{obj4}$ whose convex surface faces the object side, in that order.

The first focusing lens group $G_{F1}$ includes, from the object side to the image side, a negative meniscus lens $L_{F11}$ whose convex surface faces the object side, and a cemented lens $SU_{F11}$, which is made up of a biconcave negative lens $L_{F12}$ and a positive meniscus lens $L_{F13}$ whose convex surface faces the object side, in that order.

The second focusing lens group $G_{F2}$ includes, from the object side to the image side, a biconvex positive lens $L_{F21}$, and a cemented lens $SU_{F21}$, which is made up of a biconvex positive lens $L_{F22}$ and a biconcave negative lens $L_{F23}$, in that order.

The wobbling lens group $G_{wob}$ includes one negative meniscus lens $L_{img1}$ whose convex surface faces the object side.

The image-side lens group $G_{img}$ includes one positive meniscus lens $L_{img1}$ whose convex surface faces the object side.

Figure 3A:
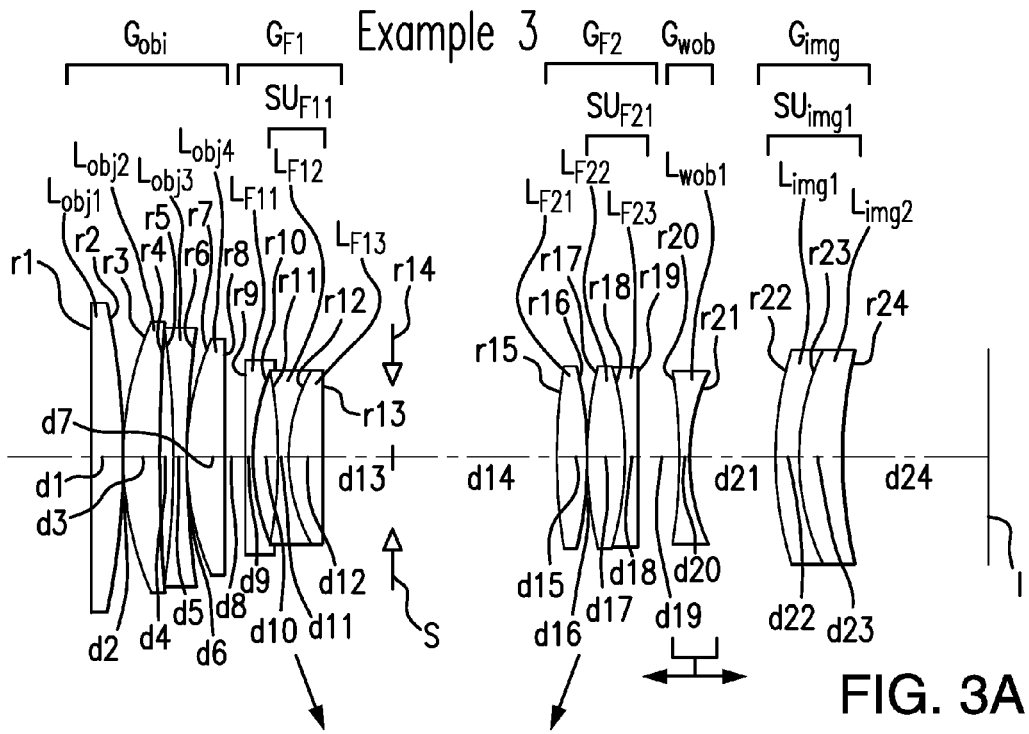
FIG. 3 is a cross-sectional view of a lens system of Example 3 expanded and taken along an optical axis.
Figure 3B:
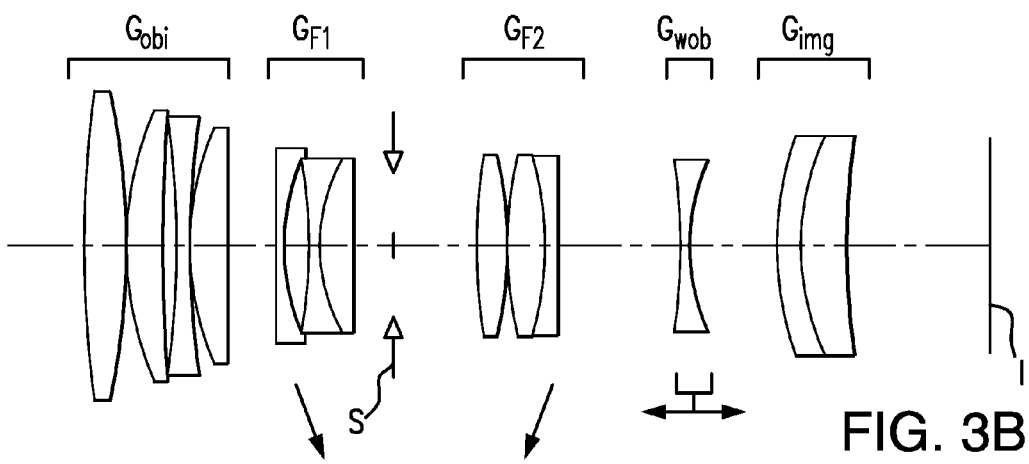
Figure 3C:
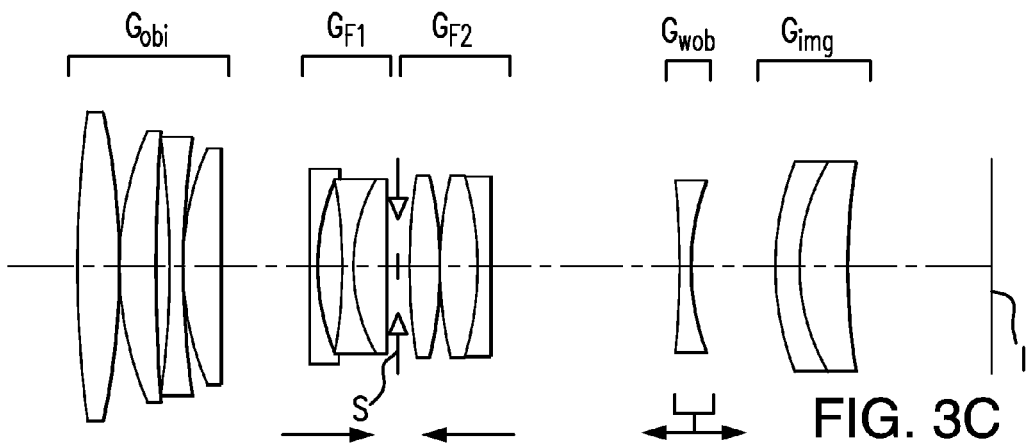

FIG. 3 shows cross-sectional views of a lens system of Example 3

As shown in the diagram, the lens system of Example 3 includes, from an object side to an image side, an object-side lens group $G_{obj}$ having positive refractive power, a first focusing lens group $G_{F1}$ having negative refractive power, a second focusing lens group $G_{F2}$ having positive refractive power, a wobbling lens group $G_{wob}$ having negative refractive power, and an image-side lens group $G_{img}$ having positive refractive power, in that order. In the diagram, "S" denotes an aperture diaphragm, and "I" an image plane.

The object-side lens group $G_{obj}$ includes, from the object side to the image side, a biconvex positive lens $L_{obj1}$, a positive meniscus lens $L_{obj2}$ whose convex surface faces the object side, a biconcave negative lens $L_{obj3}$, and a positive meniscus lens $L_{obje4}$ whose convex surface faces the object side, in that order.

The first focusing lens group $G_{F1}$ includes, from the object side to the image side, a negative meniscus lens $L_{F11}$ whose convex surface faces the object side, and a cemented lens $SU_{F11}$, which is made up of a biconcave negative lens $L_{F12}$ and a biconvex positive lens $L_{F13}$ in that order.

The second focusing lens group $G_{F2}$ includes, from the object side to the image side, a biconvex positive lens $L_{F21}$, and a cemented lens $SU_{F21}$, which is made up of a biconvex positive lens $L_{F22}$ and a biconcave negative lens $L_{F23}$, in that order.

The wobbling lens group $G_{wob}$ includes one biconcave negative lens $L_{wob1}$.

The image-side lens group $G_{img}$ includes a cemented lens $SU_{img1}$, which is made up of a negative meniscus lens $L_{img1}$ whose convex surface faces the object side and a positive meniscus lens $L_{img2}$ whose convex surface faces the object side.

Figure 4A:
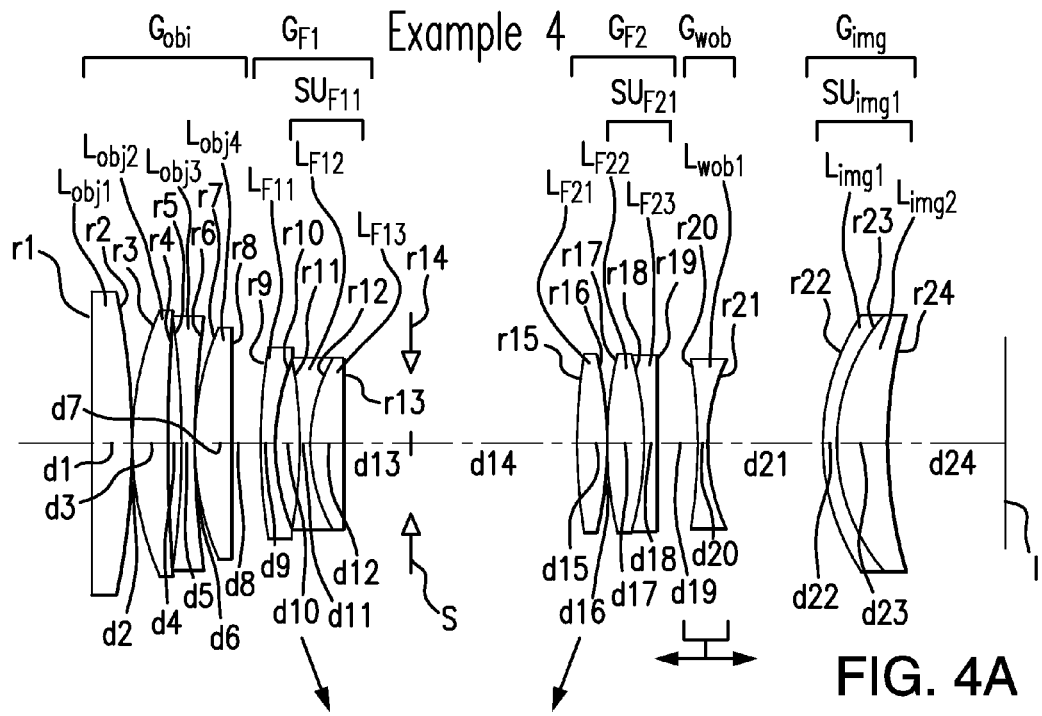
FIG. 4 is a cross-sectional view of a lens system of Example 4 expanded and taken along an optical axis.
Figure 4B:
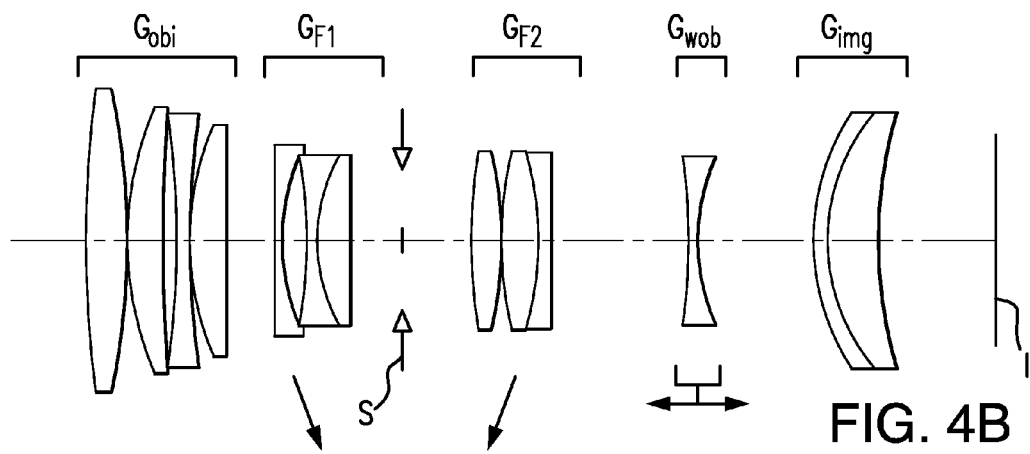
Figure 4C:
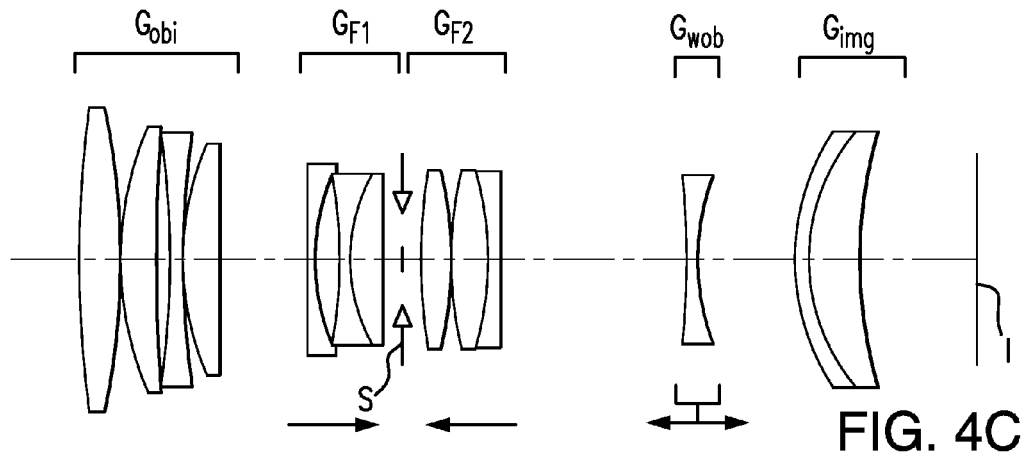

FIG. 4 shows cross-sectional views of a lens system of Example 4.

As shown in the diagram, the lens system of Example 4 includes, from an object side to an image side, an object-side lens group $G_{obj}$ having positive refractive power, a first focusing lens group $G_{F1}$ having negative refractive power, a second focusing lens group $G_{F2}$ having positive refractive power, a wobbling lens group $G_{wob}$ having negative refractive power, and an image-side lens group $G_{img}$ having positive refractive power, in that order. In the diagram, "S" denotes an aperture diaphragm, and "I" an image plane.

The object-side lens group $G_{obj}$ includes, from the object side to the image side, a biconvex positive lens $L_{obj1}$, a positive meniscus lens $L_{obj2}$ whose convex surface faces the object side, a biconcave negative lens $L_{obj3}$, and a positive meniscus lens $L_{obj4}$ whose convex surface faces the object side, in that order.

The first focusing lens group $G_{F1}$ includes, from the object side to the image side, a negative meniscus lens $L_{F11}$ whose convex surface faces the object side, and a cemented lens $SU_{F11}$, which is made up of a biconcave negative lens $L_{F12}$ and a biconvex positive lens $L_{F13}$, in that order.

The second focusing lens group $G_{F2}$ includes, from the object side to the image side, a biconvex positive lens $L_{F21}$, and a cemented lens $SU_{F21}$, which is made up of a biconvex positive lens $L_{F22}$ and a biconcave negative lens $L_{F23}$, in that order.

The wobbling lens group $G_{wob}$ includes one biconcave negative lens $L_{wob1}$.

The image-side lens group $G_{img}$ includes a cemented lens $SU_{img1}$, which is made up of a negative meniscus lens $L_{img1}$ whose convex surface faces the object side and a positive meniscus lens $L_{img2}$ whose convex surface faces the object side.

Figure 5A:
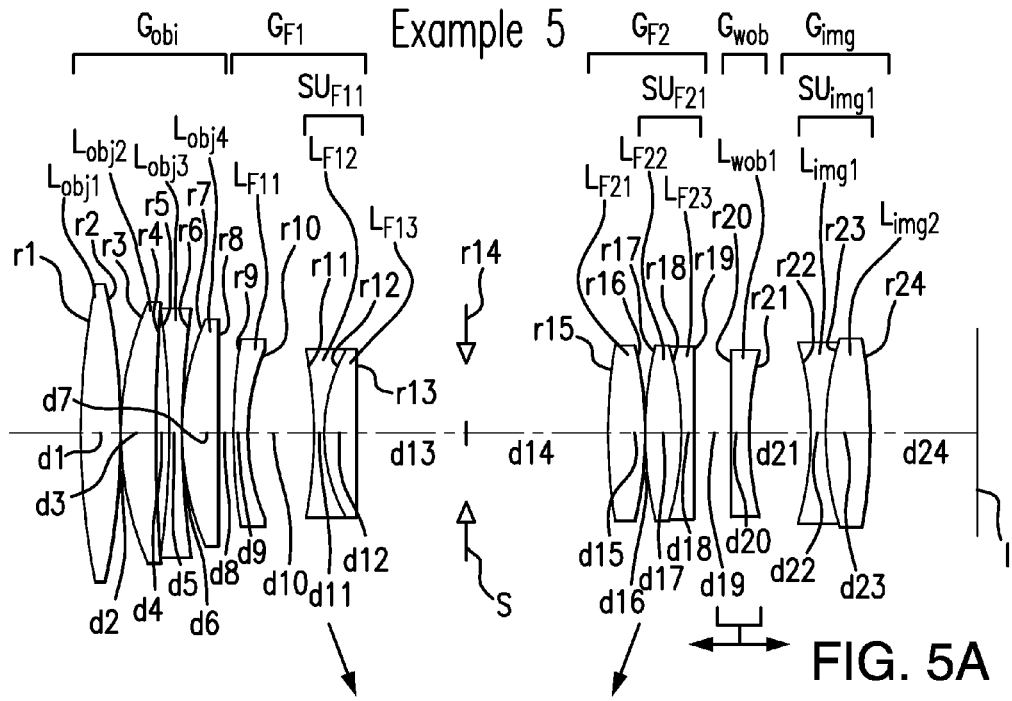
FIG. 5 is a cross-sectional view of a lens system of Example 5 expanded and taken along an optical axis.
Figure 5B:
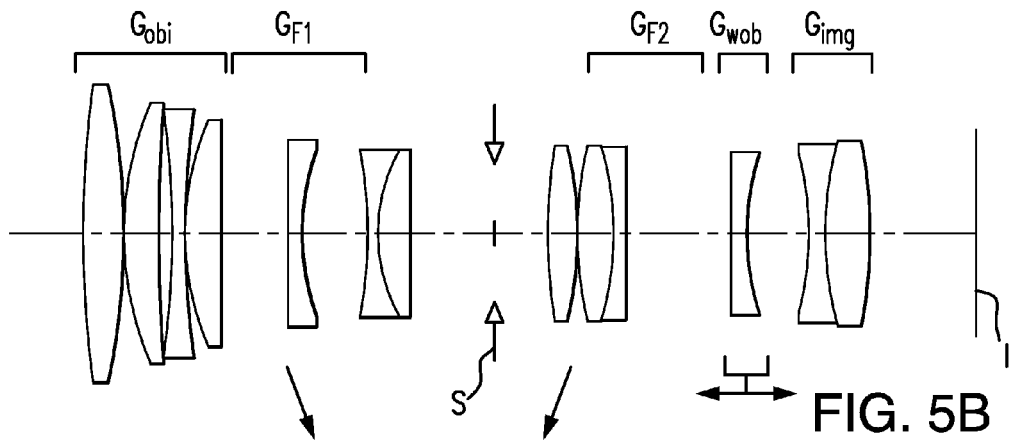
Figure 5C:
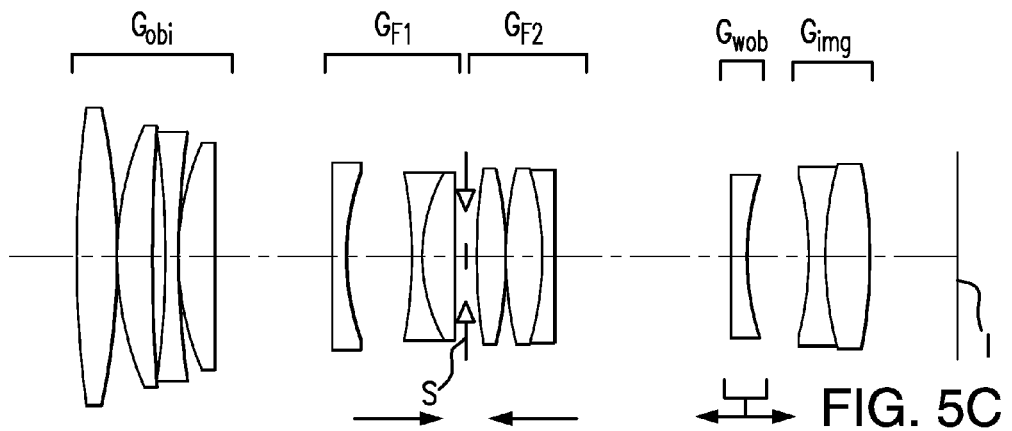

FIG. 5 shows cross-sectional views of a lens system of Example 5.

As shown in the diagram, the lens system of Example 5 includes, from an object side to an image side, an object-side lens group $G_{obj}$ having positive refractive power, a first focusing lens group $G_{F1}$ having negative refractive power, a second focusing lens group $G_{F2}$ having positive refractive power, a wobbling lens group $G_{wob}$ having negative refractive power, and an image-side lens group $G_{img}$ having negative refractive power, in that order. In the diagram, "S" denotes an aperture diaphragm, and "I" an image plane.

The object-side lens group $G_{obj}$ includes, from the object side to the image side, a biconvex positive lens $L_{obj1}$, a positive meniscus lens $L_{obj2}$ whose convex surface faces the object side, a biconcave negative lens $L_{obj3}$, and a positive meniscus lens $L_{obj4}$ whose convex surface faces the object side, in that order.

The first focusing lens group $G_{F1}$ includes, from the object side to the image side, a negative meniscus lens $L_{F11}$ whose convex surface faces the object side, and a cemented lens $SU_{F11}$, which is made up of a biconcave negative lens $L_{F12}$ and a positive meniscus lens $L_{F13}$ whose convex surface faces the object side, in that order.

The second focusing lens group $G_{F2}$ includes, from the object side to the image side, a biconvex positive lens $L_{F21}$, and a cemented lens $SU_{F21}$, which is made up of a biconvex positive lens $L_{F22}$ and a biconcave negative lens $L_{F23}$, in that order.

The wobbling lens group $G_{wob}$ includes one biconcave negative lens $L_{wob1}$.

The image-side lens group $G_{img}$ includes a cemented lens $SU_{img1}$, which is made up of a biconcave negative lens $L_{img1}$ and a biconvex positive lens $L_{img2}$.

Figure 6A:
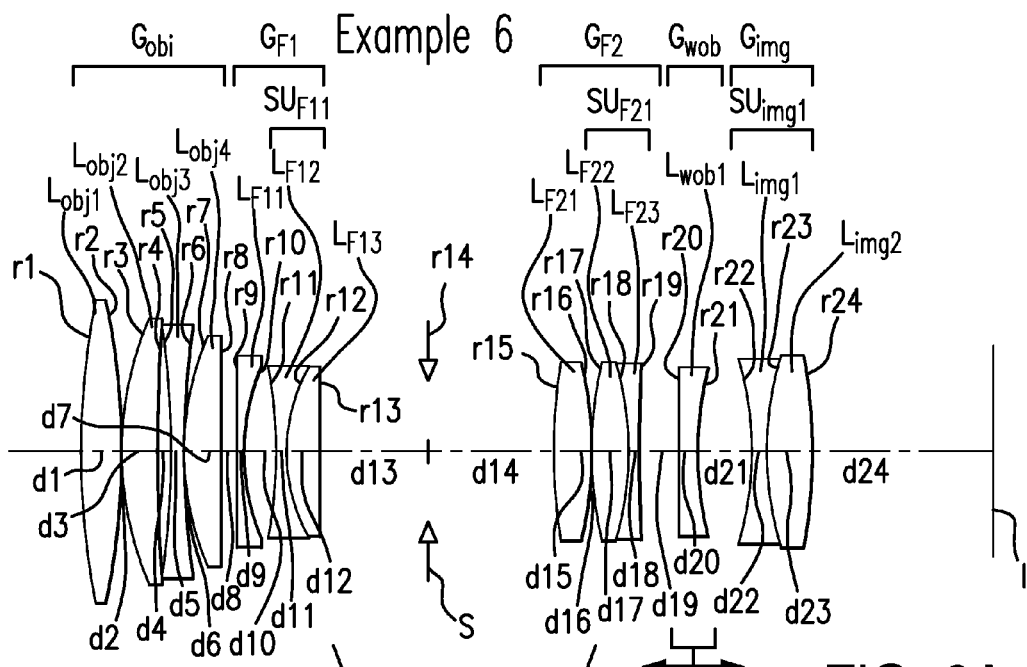
FIG. 6 is a cross-sectional view of a lens system of Example 6 expanded and taken along an optical axis.
Figure 6B:
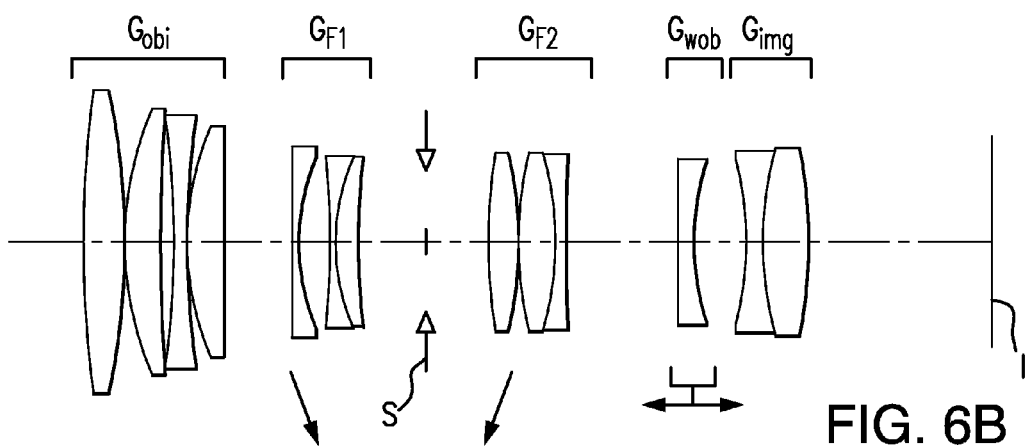
Figure 6C:
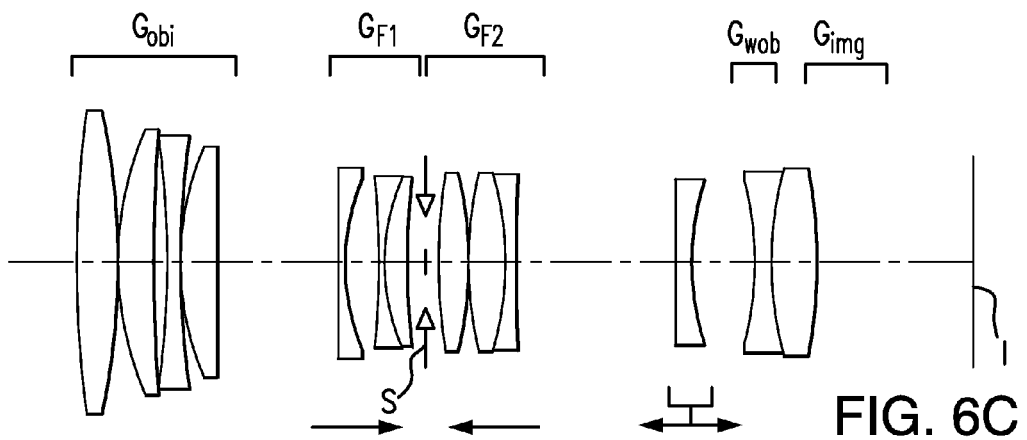
Figure 8A:
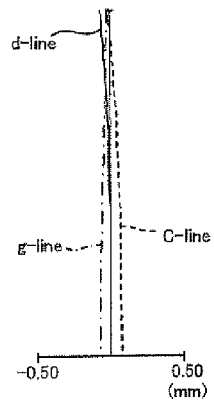
FIG. 8 is an aberration diagram of the lens system of Example 2.
Figure 8B:
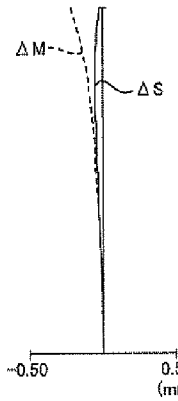
Figure 8C:
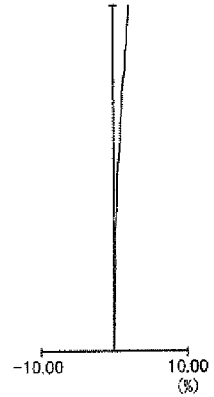
Figure 8D:
Figure 8E:
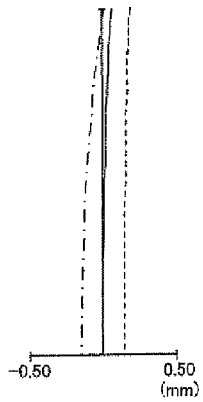
Figure 8F:
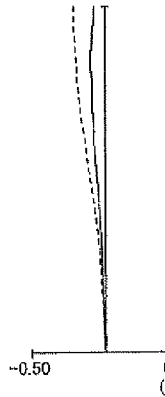
Figure 8G:
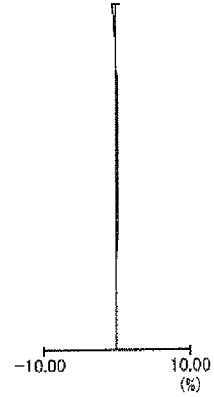
Figure 8H:
Figure 8I:
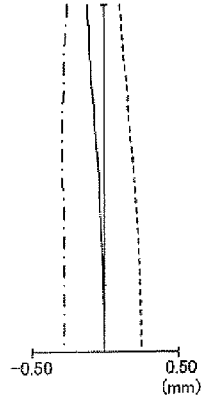
Figure 8J:
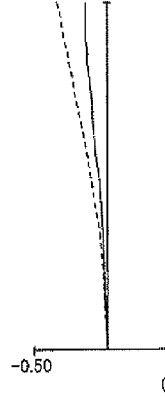
Figure 8K:
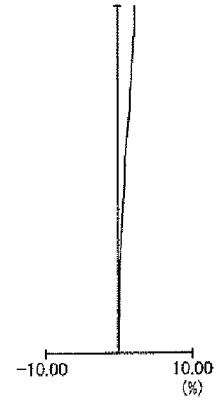
Figure 8L:
Figure 9A:
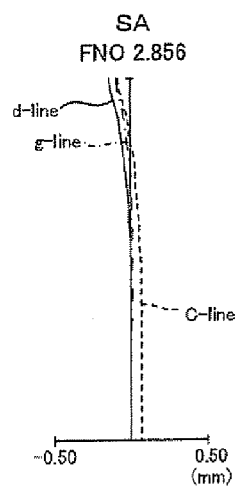
FIG. 9 is an aberration diagram of the lens system of Example 3.
Figure 9B:
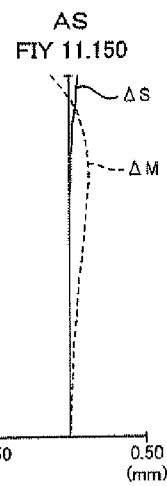
Figure 9C:
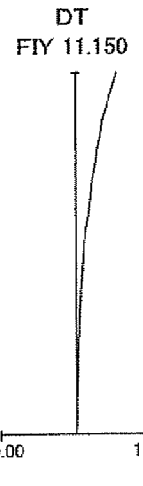
Figure 9D:
Figure 9E:
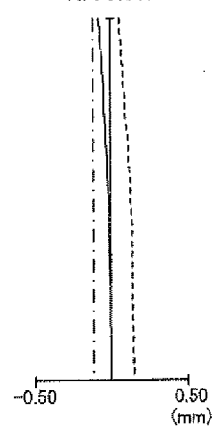
Figure 9F:
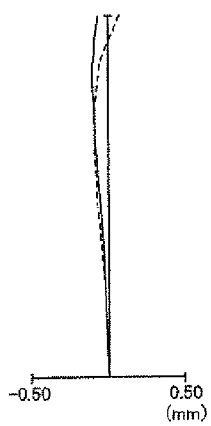
Figure 9G:
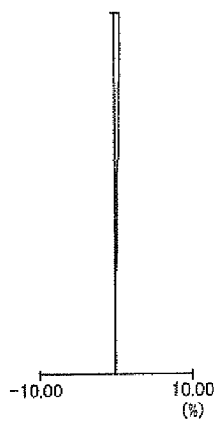
Figure 9H:
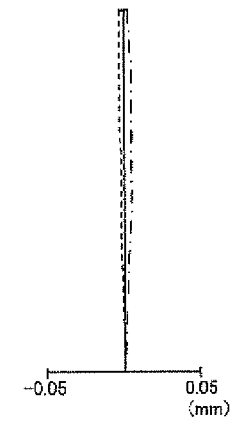
Figure 9I:
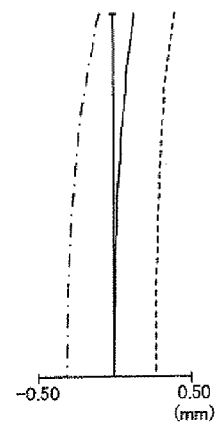
Figure 9J:
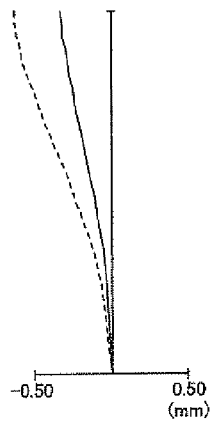
Figure 9K:
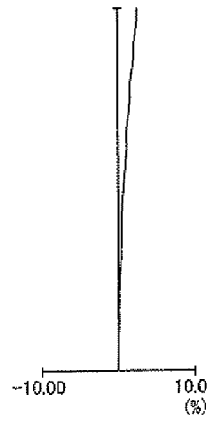
Figure 9L:
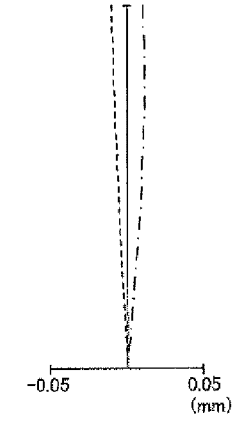
Figure 10A:
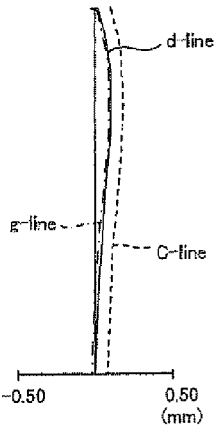
FIG. 10 is an aberration diagram of the lens system of Example 4.
Figure 10B:
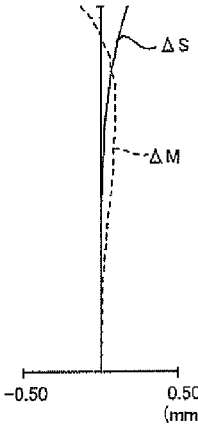
Figure 10C:
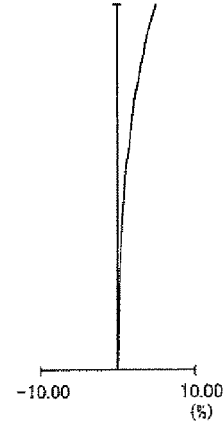
Figure 10D:
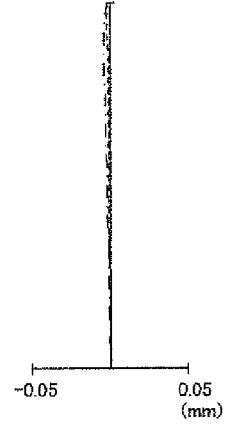
Figure 10E:
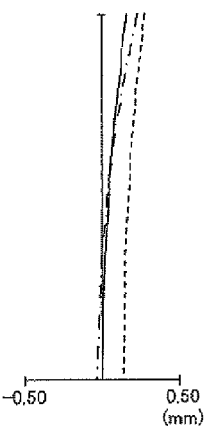
Figure 10F:
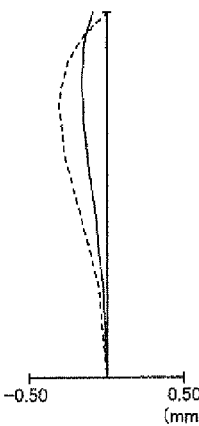
Figure 10G:
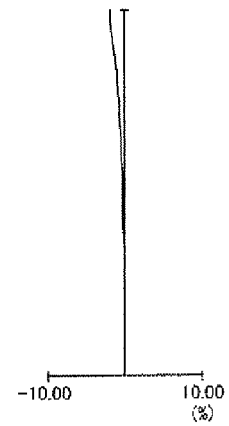
Figure 10H:
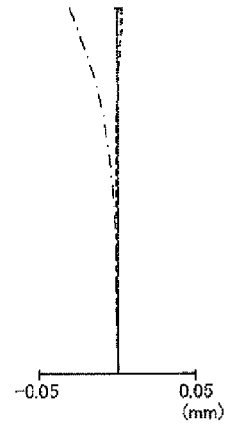
Figure 10I:
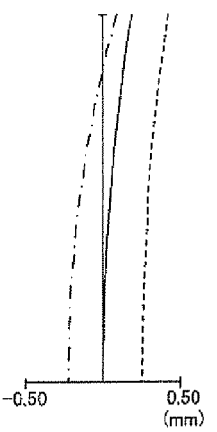
Figure 10J:
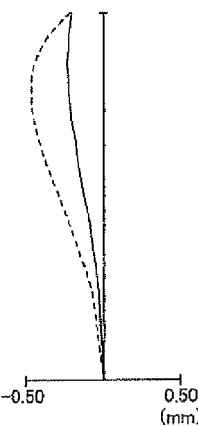
Figure 10K:
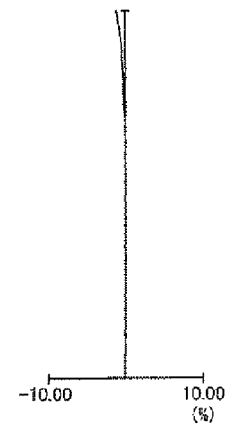
Figure 10L:
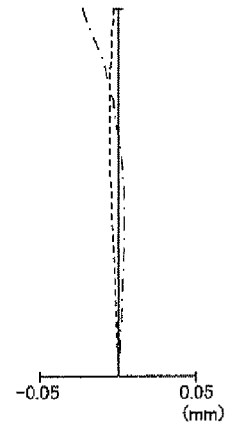
Figure 11A:
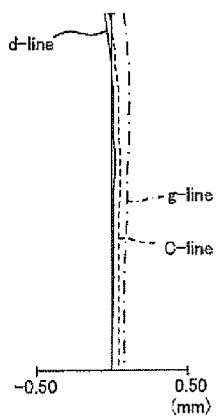
FIG. 11 is an aberration diagram of the lens system of Example 5.
Figure 11B:
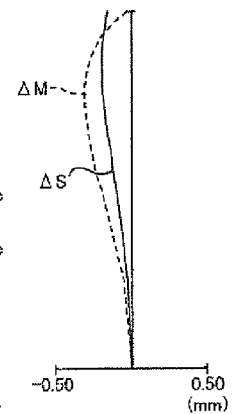
Figure 11C:
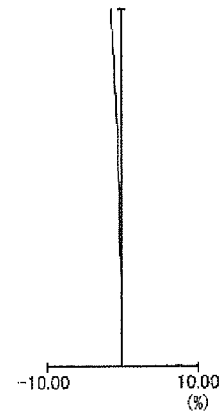
Figure 11D:
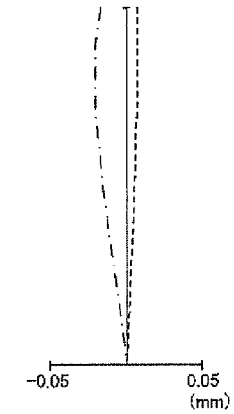
Figure 11E:
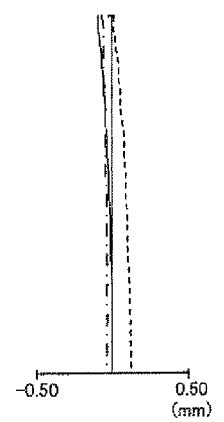
Figure 11F:
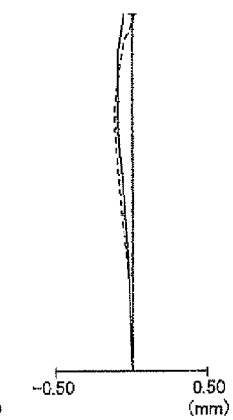
Figure 11G:
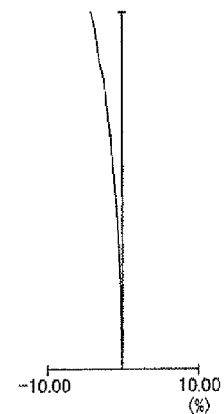
Figure 11H:
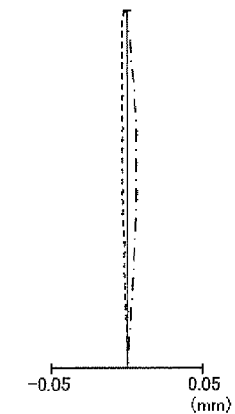
Figure 11I:
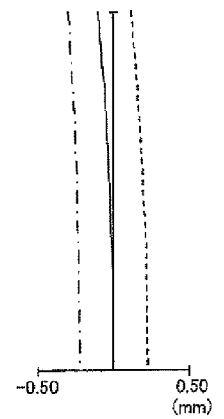
Figure 11J:
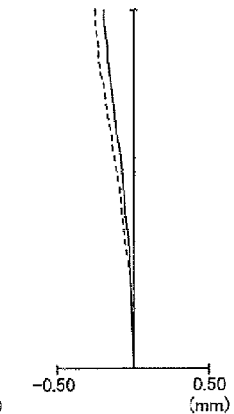
Figure 11K:
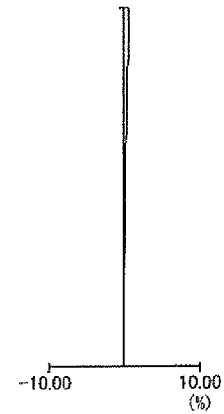
Figure 11L:
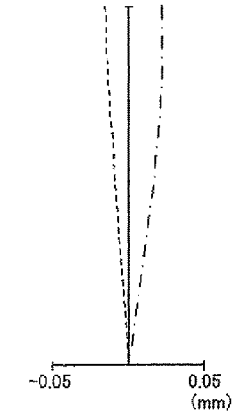

FIG. 6 shows cross-sectional views of a lens system of Example 6.

As shown in the diagram, the lens system of Example 6 includes, from an object side to an image side, an object-side lens group $G_{obj}$ having positive refractive power, a first focusing lens group $G_{F1}$ having negative refractive power, a second focusing lens group $G_{F2}$ having positive refractive power, a wobbling lens group $G_{wob}$ having negative refractive power, and an image-side lens group $G_{img}$ having negative refractive power, in that order. In the diagram, "S" denotes an aperture diaphragm, and "I" an image plane.

The object-side lens group $G_{obj}$ includes, from the object side to the image side, a biconvex positive lens $L_{obj1}$, a biconvex positive lens $L_{obj2}$, a biconcave negative lens $L_{obj3}$, and a biconvex positive lens $L_{obj4}$, in that order.

The first focusing lens group $G_{F1}$ includes, from the object side to the image side, a biconcave negative lens $L_{F11}$ and a cemented lens $SU_{F11}$, which is made up of a biconcave negative lens $L_{F12}$ and a positive meniscus lens $L_{F13}$ whose convex surface faces the object side, in that order.

The second focusing lens group $G_{F2}$ includes, from the object side to the image side, a biconvex positive lens $L_{F21}$, and a cemented lens $SU_{F21}$, which is made up of a biconvex positive lens $L_{F22}$ and a biconcave negative lens $L_{F23}$, in that order.

The wobbling lens group $G_{wob}$ includes one negative meniscus lens $L_{wob1}$ whose convex surface faces the object side.

The image-side lens group $G_{img}$ includes a cemented lens $SU_{img1}$, which is made up of a biconcave negative lens $L_{img1}$ and a biconvex positive lens $L_{img2}$.

A focusing operation of the lens systems of Examples 1 to 6 will be described.

In the focusing operation, the object-side lens group $G_{obj}$, the aperture diaphragm S, and the image-side lens group $G_{img}$ remain fixed; the first focusing lens group $G_{F1}$ and the second focusing lens group $G_{F2}$ move independently.

A wobbling operation is performed in the wobbling lens group $G_{wob}$. The wobbling lens group $G_{wob}$ vibrates in an optical-axis direction.

When the magnification is changed from a focused-at-infinity period to −0.1, the first focusing lens group $G_{F1}$ moves, from the focused-at-infinity period to a magnification of −0.1, to the image side while widening the distance to the object-side lens group $G_{obj}$ and narrowing the distance to the aperture diaphragm S. The second focusing lens group $G_{F2}$ moves, from the focused-at-infinity period to a magnification of −0.1, to the object side while narrowing the distance to the diaphragm S and widening the distance to the wobbling lens group $G_{wob}$.

Before the first focusing lens group $G_{F1}$ and the second focusing lens group $G_{F2}$ start to move, the wobbling lens group $G_{wob}$ vibrates in a way that changes an image formation state on the image pickup plane. On the basis of the changed image formation state, a control circuit, which is not shown in the diagrams, calculates the traveling directions and traveling distances of the first focusing lens group $G_{F1}$ and the second focusing lens group $G_{F2}$ for focusing. Then, in accordance with the calculated traveling directions and traveling distances of the first focusing lens group $G_{F1}$ and the second focusing lens group $G_{F2}$, the first focusing lens group $G_{F1}$ and the second focusing lens group $G_{F2}$ are controlled by a driving mechanism, which is not shown in the diagrams, so as to move.

The wobbling lens group $G_{wob}$ may vibrate at a time when the first focusing lens group $G_{F1}$ and the second focusing lens group $G_{F2}$ are moving. After the focusing of the first focusing lens group $G_{F1}$ and the second focusing lens group $G_{F2}$ is substantially completed, final adjustments are made to the focusing by the micro-movement of the wobbling lens group $G_{wob}$. However, when the focusing performance has been ensured, the micro-movement of the wobbling lens group $G_{wob}$ can be omitted. When being used in taking a moving image, the wobbling lens group $G_{wob}$ vibrates continuously, and can detect a change at any time in the distance at which an image of an object is taken. Therefore, the wobbling lens group $G_{wob}$ can remain being focused.

The following shows various kinds of numerical data of the above Examples 1 to 6 (surface data, various kinds of data, focusing data, wobbling data, and focal distances of each group).

In surface data, the following are shown: the radius of curvature r of each lens surface (optical surface) for each surface number; the surface separation d; the refractive index rid for d-line (587.6 nm) of each lens (optical medium); and the Abbe number vd of d-line of each lens (optical medium). The radius of curvature r and the surface separation d are all measured in millimeters (mm) In surface data, the symbol "∞", which is recorded as to the radius of curvature, means infinity.

In each kind of data, the back focus (in air), the total length (in air), and the image height are shown, and are all measured in millimeters (mm).

In focusing data, the focal distances, F-numbers (FNO), angles of view 2ω (degrees), incident-side NAs, and varying surface separations d for lateral magnifications of 0 (focused-at-infinity period), −0.5, and −1.0 are shown. The focal distances and the surface separations are measured in millimeters (mm).

In wobbling data, the movable range of the wobbling lens group $G_{wob}$, and the image-plane traveling distance relative to the traveling distance of each group during a focused-at-infinity period are shown.

In data about the focal distances of each group, the focal distances f1 to f5 in each lens group are shown, all measured in millimeters (mm).

NUMERICAL EXAMPLE 1

Surface data

| Surface number | r | d | nd | vd |
|---|---|---|---|---|
| 1 | 144.917 | 4.50 | 1.71819 | 48.99 |
| 2 | −74.106 | 0.10 | | |
| 3 | 36.340 | 3.90 | 1.71717 | 55.11 |
| 4 | 263.105 | 1.31 | | |
| 5 | −98.543 | 1.60 | 1.84666 | 23.78 |
| 6 | 91.577 | 0.10 | | |
| 7 | 31.563 | 3.86 | 1.49700 | 81.54 |
| 8 | ∞ | D8 (Variable) | | |
| 9 | 145.625 | 1.20 | 1.83632 | 37.52 |
| 10 | 19.317 | 2.72 | | |
| 11 | −58.516 | 1.20 | 1.74820 | 49.61 |
| 12 | 19.221 | 3.59 | 1.84666 | 23.78 |
| 13 | ∞ | 13.11 | | |
| 14 (Stop) | ∞ | D14 (Variable) | | |
| 15 | 74.677 | 3.01 | 1.69471 | 55.93 |
| 16 | −35.826 | 0.10 | | |
| 17 | 40.656 | 4.00 | 1.71828 | 55.07 |
| 18 | −28.582 | 1.20 | 1.84666 | 23.78 |
| 19 | 222.947 | D19 (Variable during wobbling operation) | | |
| 20 | −341.916 | 1.20 | 1.55368 | 63.72 |
| 21 | 43.767 | D21 (Variable during wobbling operation) | | |
| 22 | −27.685 | 1.20 | 1.70567 | 55.52 |
| 23 | 50.000 | 3.15 | 1.76659 | 28.36 |
| 24 | −47.066 | 19.40 | | |
| Image plane | ∞ | | | |

Various kinds of data

| | |
|---|---|
| fb (in air) | 19.40 |
| Total length (in air) | 98.58 |
| Image height | 11.150 |

Focusing data

| Lateral magnification | 0 | −0.5 | −1 |
|---|---|---|---|
| Focal distance | 60.72 | 50.22 | 37.54 |
| FNO | 2.856 | 2.319 | 1.041 |
| Angle of view 2ω (°) | 20.78 | 11.66 | 5.74 |
| Incident-side | NA | 0.050 | 0.082 |
| D8 | 2.00 | 6.81 | 12.11 |
| D14 | 15.05 | 8.05 | 2.40 |
| D19 (Variable during wobbling operation) | 4.65 | 11.65 | 17.30 |
| D21 (Variable during wobbling operation) | 6.43 | 6.43 | 6.43 |

Wobbling data

| | |
|---|---|
| Movable range of wobbling lens group $G_{wob}$ | ±1.00 |
| Focused-at-infinity period | |
| Image-plane traveling distance relative to first focusing lens group GF1's traveling distance 3 μm | 9.6 μm |
| Image-plane traveling distance relative to second focusing lens group GF2's traveling distance 3 μm | 7.8 μm |
| Image-plane traveling distance relative to wobbling lens group Gwob's traveling distance 3 μm | 3.5 μm |

Focal distance of each group

| | |
|---|---|
| f1 | 33.87 |
| f2 | −21.92 |
| f3 | 25.94 |
| f4 | −70.00 |
| f5 | −143.58 |

NUMERICAL EXAMPLE 2

Surface data

| Surface number | r | d | nd | vd |
|---|---|---|---|---|
| 1 | 101.853 | 4.50 | 1.72916 | 54.68 |
| 2 | −84.371 | 0.10 | | |
| 3 | 40.303 | 3.62 | 1.72916 | 54.68 |
| 4 | 275.983 | 1.16 | | |
| 5 | −118.509 | 1.60 | 1.84666 | 23.78 |
| 6 | 86.491 | 0.10 | | |
| 7 | 30.128 | 4.15 | 1.49700 | 81.54 |
| 8 | 2715.051 | D8 (Variable) | | |
| 9 | 265.609 | 1.20 | 1.83481 | 42.71 |
| 10 | 20.210 | 2.31 | | |
| 11 | −93.838 | 1.20 | 1.69680 | 55.53 |
| 12 | 21.664 | 2.85 | 1.84666 | 23.78 |

-continued

| | | | | |
|---|---|---|---|---|
| 13 | 144.289 | 13.14 | | |
| 14 (Stop) | ∞ | | D14 (Variable) | |
| 15 | 92.517 | 2.70 | 1.72916 | 54.68 |
| 16 | −43.593 | 0.10 | | |
| 17 | 33.146 | 3.95 | 1.72916 | 54.68 |
| 18 | −40.321 | 1.20 | 1.84666 | 23.78 |
| 19 | 112.173 | D19 (Variable during wobbling operation) | | |
| 20 | 87.475 | 1.20 | 1.48749 | 70.23 |
| 21 | 17.024 | D21 (Variable during wobbling operation) | | |
| 22 | 18.426 | 2.10 | 1.84666 | 23.78 |
| 23 | 20.427 | 17.97 | | |
| Image plane | ∞ | | | |

Various kinds of data

| | |
|---|---|
| fb (in air) | 17.97 |
| Total length (in air) | 96.58 |
| Image height | 11.150 |

Focusing data

| | | | |
|---|---|---|---|
| Lateral magnification | 0 | −0.5 | −1 |
| Focal distance | 58.89 | 51.00 | 38.34 |
| FNO | 2.856 | 2.222 | 1.029 |
| Angle of view 2ω (°) | 21.22 | 11.74 | 5.80 |
| Incident-side | NA | 0.054 | 0.087 |
| D8 | 2.03 | 6.85 | 11.87 |
| D14 | 16.87 | 8.94 | 2.40 |
| D19 (Variable during wobbling operation) | 3.10 | 11.03 | 17.57 |
| D21 (Variable during wobbling operation) | 9.42 | 9.42 | 9.42 |

Wobbling data

| | |
|---|---|
| Movable range of wobbling lens group $G_{wob}$ Focused-at-infinity period | ±1.00 |
| Image-plane traveling distance relative to first focusing lens group GF1's traveling distance 3 μm | 9.5 μm |
| Image-plane traveling distance relative to second focusing lens group GF2's traveling distance 3 μm | 6.4 μm |
| Image-plane traveling distance relative to wobbling lens group Gwob's traveling distance 3 μm | 4.3 μm |

Focal distance of each group

| | |
|---|---|
| f1 | 33.04 |
| f2 | −22.07 |
| f3 | 26.97 |
| f4 | −43.60 |
| f5 | 149.97 |

NUMERICAL EXAMPLE 3

Surface data

| Surface number | r | d | nd | νd |
|---|---|---|---|---|
| 1 | 304.058 | 4.14 | 1.72744 | 54.75 |
| 2 | −58.950 | 0.10 | | |
| 3 | 35.756 | 3.82 | 1.72479 | 54.84 |
| 4 | 266.291 | 1.09 | | |
| 5 | −115.480 | 1.11 | 1.84575 | 23.80 |
| 6 | 83.589 | 0.10 | | |
| 7 | 32.474 | 3.63 | 1.49700 | 81.54 |
| 8 | 201.421 | D8 (Variable) | | |
| 9 | 105.596 | 1.12 | 1.82983 | 44.32 |
| 10 | 20.792 | 2.63 | | |
| 11 | −46.996 | 0.77 | 1.74338 | 52.85 |
| 12 | 20.322 | 3.46 | 1.84908 | 27.84 |
| 13 | −295.036 | 8.04 | | |
| 14 (Stop) | ∞ | | D14 (Variable) | |
| 15 | 72.425 | 3.70 | 1.69181 | 56.05 |
| 16 | −40.315 | 0.10 | | |
| 17 | 38.600 | 4.18 | 1.71169 | 52.03 |
| 18 | −30.888 | 1.54 | 1.84730 | 23.96 |
| 19 | 324.922 | D19 (Variable during wobbling operation) | | |
| 20 | −79.361 | 0.94 | 1.63283 | 58.69 |
| 21 | 20.917 | D21 (Variable during wobbling operation) | | |
| 22 | 34.450 | 2.53 | 1.48800 | 70.20 |
| 23 | 24.587 | 4.99 | 1.88300 | 40.77 |
| 24 | 72.699 | 15.72 | | |
| Image plane | ∞ | | | |

Various kinds of data

| | |
|---|---|
| fb (in air) | 15.72 |
| Total length (in air) | 97.39 |
| Image height | 11.150 |

Focusing data

| | | | |
|---|---|---|---|
| Lateral magnification | 0 | −0.5 | −1 |
| Focal distance | 61.44 | 52.53 | 41.54 |
| FNO | 2.856 | 2.766 | 1.770 |
| Angle of view 2ω (°) | 20.06 | 13.64 | 8.38 |
| Incident-side | NA | 0.052 | 0.079 |
| D8 | 2.72 | 6.33 | 9.77 |
| D14 | 17.80 | 9.17 | 1.05 |
| D19 (Variable during wobbling operation) | 3.85 | 12.49 | 20.60 |
| D21 (Variable during wobbling operation) | 9.30 | 9.30 | 9.30 |

Wobbling data

| | |
|---|---|
| Movable range of wobbling lens group $G_{wob}$ Focused-at-infinity period | ±0.25 |
| Image-plane traveling distance relative to first focusing lens group GF1's traveling distance 3 μm | 9.1 μm |
| Image-plane traveling distance relative to second focusing lens group GF2's traveling distance 3 μm | 7.6 μm |
| Image-plane traveling distance relative to wobbling lens group Gwob's traveling distance 3 μm | 6.6 μm |

Focal distance of each group

| | |
|---|---|
| f1 | 35.27 |
| f2 | −25.12 |
| f3 | 26.06 |
| f4 | −26.06 |
| f5 | 52.77 |

NUMERICAL EXAMPLE 4

Surface data

| Surface number | r | d | nd | νd |
|---|---|---|---|---|
| 1 | 531.907 | 6.00 | 1.72868 | 40.32 |
| 2 | −53.941 | 0.10 | | |
| 3 | 36.164 | 3.85 | 1.72614 | 54.80 |
| 4 | 271.789 | 1.11 | | |
| 5 | −121.762 | 1.09 | 1.84401 | 23.85 |
| 6 | 81.842 | 0.12 | | |
| 7 | 32.565 | 3.59 | 1.49700 | 81.54 |
| 8 | 119.381 | D8 (Variable) | | |
| 9 | 72.537 | 1.15 | 1.82557 | 44.44 |
| 10 | 20.749 | 3.14 | | |
| 11 | −41.603 | 1.65 | 1.74103 | 53.14 |
| 12 | 20.351 | 4.00 | 1.85235 | 33.30 |
| 13 | −181.926 | 6.63 | | |
| 14 (Stop) | ∞ | | D14 (Variable) | |
| 15 | 69.611 | 3.70 | 1.68766 | 56.21 |
| 16 | −46.650 | 0.10 | | |
| 17 | 34.425 | 4.26 | 1.70911 | 55.39 |
| 18 | −30.738 | 1.62 | 1.85136 | 25.19 |
| 19 | 278.655 | D19 (Variable during wobbling operation) | | |
| 20 | −79.347 | 0.88 | 1.66005 | 45.59 |
| 21 | 18.178 | D21 (Variable during wobbling operation) | | |
| 22 | 24.464 | 1.60 | 1.48800 | 70.20 |

-continued

| | | | | |
|---|---|---|---|---|
| 23 | 20.984 | 5.72 | 1.85637 | 26.86 |
| 24 | 49.742 | 12.96 | | |
| Image plane | ∞ | | | |

Various kinds of data

| | |
|---|---|
| fb (in air) | 12.96 |
| Total length (in air) | 101.44 |
| Image height | 11.150 |

Focusing data

| | | | |
|---|---|---|---|
| Lateral magnification | 0 | −0.5 | −1 |
| Focal distance | 68.83 | 56.18 | 46.26 |
| FNO | 2.856 | 3.131 | 2.096 |
| Angle of view 2ω (°) | 17.96 | 13.76 | 8.68 |
| Incident-side | NA | 0.049 | 0.075 |
| D8 | 3.26 | 5.26 | 8.90 |
| D14 | 18.40 | 8.65 | 1.00 |
| D19 (Variable during wobbling operation) | 3.29 | 13.04 | 20.69 |
| D21 (Variable during wobbling operation) | 13.19 | 13.19 | 13.19 |

Wobbling data

| | |
|---|---|
| Movable range of wobbling lens group $G_{wob}$ Focused-at-infinity period | ±0.25 |
| Image-plane traveling distance relative to first focusing lens group GF1's traveling distance 3 μm | 10.4 μm |
| Image-plane traveling distance relative to second focusing lens group GF2's traveling distance 3 μm | 8.7 μm |
| Image-plane traveling distance relative to wobbling lens group Gwob's traveling distance 3 μm | 7.8 μm |

Focal distance of each group

| | |
|---|---|
| f1 | 36.80 |
| f2 | −28.15 |
| f3 | 26.41 |
| f4 | −22.33 |
| f5 | 44.94 |

NUMERICAL EXAMPLE 5

Surface data

| Surface number | r | d | nd | νd |
|---|---|---|---|---|
| 1 | 75.612 | 4.99 | 1.71227 | 43.83 |
| 2 | −86.177 | 0.10 | | |
| 3 | 45.553 | 3.82 | 1.71127 | 55.32 |
| 4 | 852.689 | 1.27 | | |
| 5 | −85.461 | 2.03 | 1.85320 | 25.78 |
| 6 | 88.356 | 0.10 | | |
| 7 | 33.138 | 3.84 | 1.49700 | 81.54 |
| 8 | 987.340 | D8 (Variable) | | |
| 9 | 176.310 | 1.14 | 1.84066 | 43.51 |
| 10 | 21.615 | 8.09 | | |
| 11 | −78.990 | 0.83 | 1.75107 | 39.22 |
| 12 | 18.009 | 3.40 | 1.84270 | 23.88 |
| 13 | 167.009 | 12.91 | | |
| 14 (Stop) | ∞ | D14 (Variable) | | |
| 15 | 67.528 | 3.70 | 1.69876 | 55.78 |
| 16 | −40.353 | 0.10 | | |
| 17 | 34.742 | 4.23 | 1.72151 | 54.96 |
| 18 | −32.104 | 1.53 | 1.84279 | 23.88 |
| 19 | 152.458 | D19 (Variable during wobbling operation) | | |
| 20 | −743.405 | 2.03 | 1.54793 | 64.18 |
| 21 | 37.312 | D21 (Variable during wobbling operation) | | |
| 22 | −33.416 | 1.59 | 1.69390 | 55.97 |
| 23 | 32.648 | 4.99 | 1.78098 | 34.40 |
| 24 | −56.538 | 17.44 | | |
| Image plane | ∞ | | | |

-continued

Various kinds of data

| | |
|---|---|
| fb (in air) | 17.44 |
| Total length (in air) | 106.45 |
| Image height | 11.150 |

Focusing data

| | | | |
|---|---|---|---|
| Lateral magnification | 0 | −0.5 | −1 |
| Focal distance | 56.33 | 54.40 | 40.97 |
| FNO | 2.856 | 2.254 | 0.952 |
| Angle of view 2ω (°) | 22.56 | 10.84 | 4.60 |
| Incident-side | NA | 0.051 | 0.078 |
| D8 | 1.17 | 7.38 | 12.71 |
| D14 | 15.90 | 8.49 | 1.11 |
| D19 (Variable during wobbling operation) | 4.28 | 11.70 | 19.08 |
| D21 (Variable during wobbling operation) | 6.96 | 6.96 | 6.96 |

Wobbling data

| | |
|---|---|
| Movable range of wobbling lens group $G_{wob}$ Focused-at-infinity period | ±0.25 |
| Image-plane traveling distance relative to first focusing lens group GF1's traveling distance 3 μm | 7.0 μm |
| Image-plane traveling distance relative to second focusing lens group GF2's traveling distance 3 μm | 7.2 μm |
| Image-plane traveling distance relative to wobbling lens group Gwob's traveling distance 3 μm | 3.5 μm |

Focal distance of each group

| | |
|---|---|
| f1 | 36.57 |
| f2 | −21.54 |
| f3 | 25.17 |
| f4 | −64.78 |
| f5 | −306.23 |

NUMERICAL EXAMPLE 6

Surface data

| Surface number | r | d | nd | νd |
|---|---|---|---|---|
| 1 | 63.535 | 5.50 | 1.70867 | 55.41 |
| 2 | −89.039 | 0.10 | | |
| 3 | 51.573 | 3.63 | 1.70522 | 55.54 |
| 4 | −729.931 | 1.42 | | |
| 5 | −70.119 | 0.59 | 1.85868 | 27.71 |
| 6 | 89.393 | 0.10 | | |
| 7 | 31.973 | 4.31 | 1.49700 | 81.54 |
| 8 | −391.128 | D8 (Variable) | | |
| 9 | −295.035 | 0.60 | 1.85077 | 42.79 |
| 10 | 26.888 | 3.44 | | |
| 11 | −109.616 | 0.55 | 1.75815 | 50.17 |
| 12 | 18.163 | 2.96 | 1.83244 | 24.15 |
| 13 | 69.237 | 13.25 | | |
| 14 (Stop) | ∞ | D14 (Variable) | | |
| 15 | 61.689 | 3.50 | 1.71072 | 55.34 |
| 16 | −43.027 | 0.10 | | |
| 17 | 31.102 | 4.18 | 1.73068 | 54.47 |
| 18 | −44.326 | 1.30 | 1.82625 | 24.32 |
| 19 | 116.767 | D19 (Variable during wobbling operation) | | |
| 20 | 128.511 | 1.96 | 1.53798 | 62.36 |
| 21 | 29.022 | D21 (Variable during wobbling operation) | | |
| 22 | −28.910 | 1.43 | 1.69231 | 29.74 |
| 23 | 43.504 | 4.14 | 1.77974 | 25.77 |
| 24 | −49.907 | 17.94 | | |
| Image plane | ∞ | | | |

-continued

| Various kinds of data | | | |
|---|---|---|---|
| fb (in air) | | 17.94 | |
| Total length (in air) | | 97.80 | |
| Image height | | 11.150 | |

| Focusing data | | | |
|---|---|---|---|
| Lateral magnification | 0 | −0.5 | −1 |
| Focal distance | 50.85 | 49.83 | 37.86 |
| FNO | 2.856 | 2.245 | 1.009 |
| Angle of view 2ω (°) | 25.48 | 11.92 | 5.46 |
| Incident-side | NA | 0.052 | 0.083 |
| D8 | 1.86 | 7.84 | 13.38 |
| D14 | 14.29 | 6.99 | 1.10 |
| D19 (Variable during wobbling operation) | 4.40 | 11.69 | 17.58 |
| D21 (Variable during wobbling operation) | 6.26 | 6.26 | 6.26 |

Wobbling data

| | |
|---|---|
| Movable range of wobbling lens group $G_{wob}$ | ±0.25 |
| Focused-at-infinity period | |
| Image-plane traveling distance relative to first focusing lens group GF1's traveling distance 3 μm | 6.0 μm |
| Image-plane traveling distance relative to second focusing lens group GF2's traveling distance 3 μm | 6.9 μm |
| Image-plane traveling distance relative to wobbling lens group Gwob's traveling distance 3 μm | 3.1 μm |

| Focal distance of each group | |
|---|---|
| f1 | 35.21 |
| f2 | −19.22 |
| f3 | 23.31 |
| f4 | −70.17 |
| f5 | −193.76 |

FIGS. 7 to 12 are various-aberration diagrams of Examples 1 to 6: (a) the magnification is 0 (focused-at-infinity period); (b) the magnification is −0.5; (c) the magnification is −1.0.

In the various-aberration diagrams, SA represents the spherical aberration; AS represents the astigmatism; DT represents the distortion aberration; and CC represents the chromatic aberration of magnification. The spherical aberration, SA, is shown for each of the following wavelengths: 587.67 nm (d-line: solid line); 435.8 nm (g-line: one-dot chain line); and 656.3 nm (C-line: broken line). The chromatic aberration of magnification, CC, is shown for each of the following wavelengths on the basis of d-line: 435.8 nm (g-line: one-dot chain line); and 656.3 nm (C-line: broken line). As for the astiytnatism AS, the solid line represents the astigmatism of the sagittal image surface; the broken line represents the astigmatism of the meridional image surface. Incidentally, FNO represents the F-number, and FIY represents the maximum height of image.

As for the above Examples 1 to 6, the values of each component and of each of the conditional expressions (1) to (11) are shown below.

| | Example 1 | Example 2 | Example 3 |
|---|---|---|---|
| Dwob | 1.20 | 1.20 | 0.94 |
| DF1 | 8.70 | 7.56 | 7.97 |
| DF2 | 8.31 | 7.96 | 9.52 |
| y 1 | 11.150 | 11.150 | 11.150 |
| y 0.7 | 7.805 | 7.805 | 7.805 |
| y 1' | 11.154 | 11.152 | 11.153 |
| y 0.7' | 7.807 | 7.807 | 7.807 |
| Δs | 0.089 | 0.089 | 0.089 |
| f obj | 33.87 | 33.04 | 35.27 |
| f F1 | −21.92 | −22.07 | −25.12 |
| f F2 | 25.94 | 26.97 | 26.06 |
| f wob | −70.00 | −43.60 | −26.06 |
| f inf | 60.72 | 58.89 | 61.44 |
| |M1F| | 10.11 | 9.84 | 7.04 |
| |M2F| | 12.65 | 14.47 | 16.74 |
| Mwob | 2.00 | 0.20 | 0.50 |
| Ltotal | 98.58 | 96.58 | 97.39 |
| Lbf | 19.40 | 17.97 | 15.72 |
| Bmax | 1.00 | 1.00 | 1.00 |

| | Example 4 | Example 5 | Example 6 |
|---|---|---|---|
| Dwob | 0.88 | 2.03 | 1.96 |
| DF1 | 9.94 | 13.45 | 7.55 |
| DF2 | 9.68 | 9.56 | 9.08 |
| y 1 | 11.150 | 11.150 | 11.150 |
| y 0.7 | 7.805 | 7.805 | 7.805 |
| y 1' | 11.152 | 11.155 | 11.155 |
| y 0.7' | 7.807 | 7.808 | 7.808 |
| Δs | 0.089 | 0.089 | 0.089 |
| f obj | 36.80 | 36.57 | 35.21 |
| f F1 | −28.15 | −21.54 | −19.22 |
| f F2 | 26.41 | 25.17 | 23.31 |
| f wob | −22.33 | −64.78 | −70.17 |
| f inf | 68.83 | 56.33 | 50.85 |
| |M1F| | 5.63 | 11.54 | 11.52 |
| |M2F| | 17.40 | 14.80 | 13.18 |
| Mwob | 0.50 | 0.50 | 0.50 |
| Ltotal | 101.44 | 106.45 | 97.80 |
| Lbf | 12.96 | 17.44 | 17.94 |
| Bmax | 1.00 | 1.00 | 1.00 |

| | Example 1 | Example 2 | Example 3 |
|---|---|---|---|
| Conditional expression (1) | 0.071 | 0.077 | 0.054 |
| Conditional expression (2) | −0.647 | −0.668 | −0.712 |
| Conditional expression (3) | −0.845 | −0.818 | −0.964 |
| Conditional expression (4) | 0.033 | 0.021 | 0.023 |
| Conditional expression (5) | 0.030 | 0.023 | 0.021 |
| Conditional expression (6) | 0.558 | 0.561 | 0.574 |
| Conditional expression (7) | 0.427 | 0.458 | 0.424 |
| Conditional expression (8) | 1.153 | 0.740 | 0.424 |
| Conditional expression (9) | 0.800 | 0.680 | 0.421 |
| Conditional expression (10) | 0.088 | 0.008 | 0.021 |
| Conditional expression (11) | 0.197 | 0.186 | 0.161 |

| | Example 4 | Example 5 | Example 6 |
|---|---|---|---|
| Conditional expression (1) | 0.045 | 0.088 | 0.118 |
| Conditional expression (2) | −0.765 | −0.589 | −0.546 |
| Conditional expression (3) | −1.066 | −0.856 | −0.825 |
| Conditional expression (4) | 0.022 | 0.042 | 0.045 |
| Conditional expression (5) | 0.019 | 0.038 | 0.039 |
| Conditional expression (6) | 0.535 | 0.649 | 0.692 |
| Conditional expression (7) | 0.384 | 0.447 | 0.458 |
| Conditional expression (8) | 0.324 | 1.150 | 1.380 |
| Conditional expression (9) | 0.324 | 0.780 | 0.874 |
| Conditional expression (10) | 0.022 | 0.019 | 0.020 |
| Conditional expression (11) | 0.128 | 0.164 | 0.183 |

Figure 13:
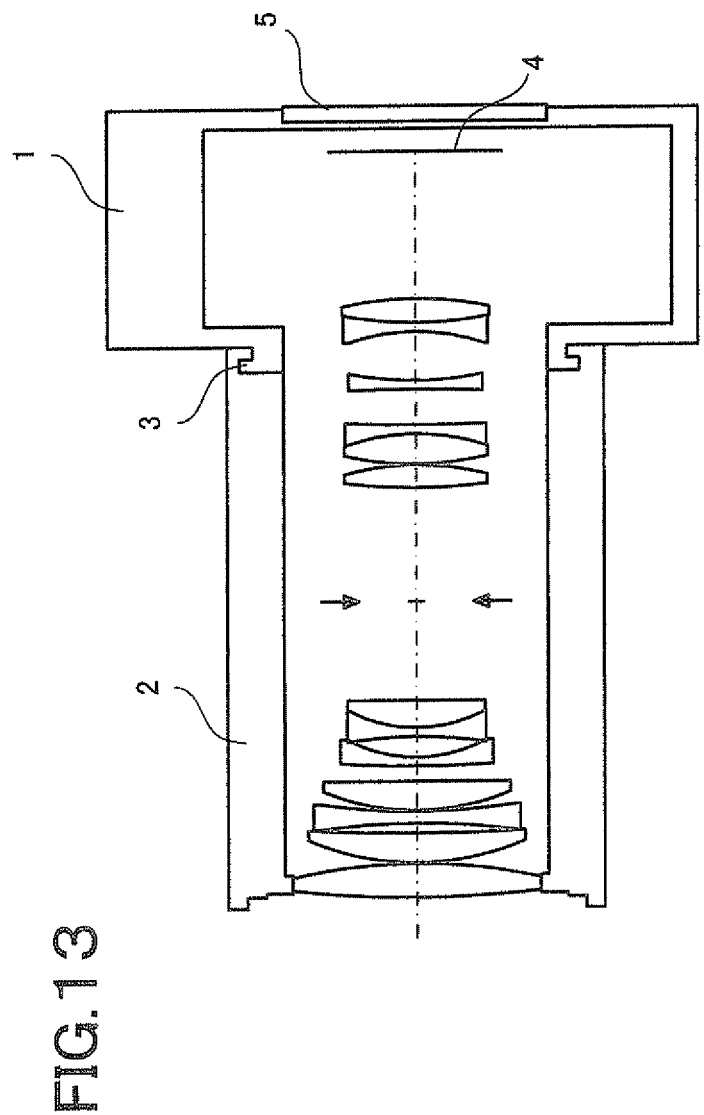
FIG. 13 is a cross-sectional view of an image pickup device in which a lens system of the present embodiment is used as an interchangeable lens.

FIG. 13 is a cross-sectional view of a single lens mirror-less camera, which is an image pickup device that uses a lens system of the present embodiment, as well as small-size CCD, CMOS or the like as an image pickup element. In FIG. 13, the reference numeral 1 represents a single lens mirror-less camera; 2 an image pickup lens system, which is disposed in a lens tube; and 3 a lens tube's mount section, which enables the image pickup lens system 2 to be attached to or removed from the single lens mirror-less camera 1 and for which the mount of a screw type, bayonet type or any other type is used. In the example here, the mount of a bayonet type is used. The reference numeral 4 represents an image pickup element plane, and 5 a back monitor.

For the image pickup lens system 2 of the single lens mirror-less camera 1 having such a configuration, for example, the lens systems of the present embodiment, which are shown in the above Examples 1 to 7, are used.

Figure 14:
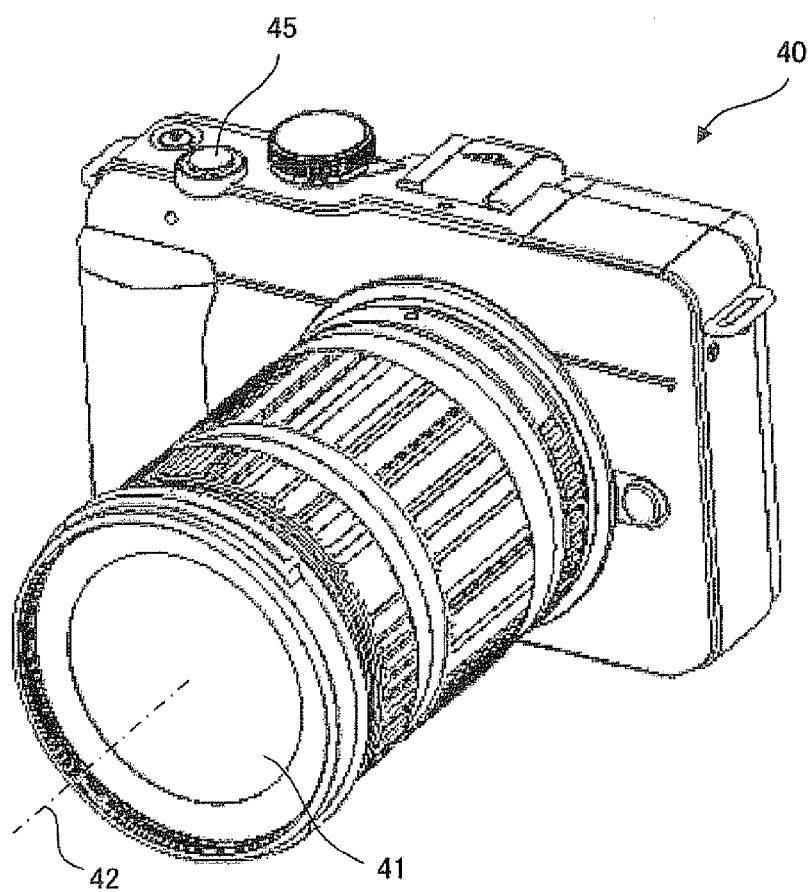
FIG. 14 is a perspective view showing the front appearance of a digital camera according to the present embodiment.
Figure 15:
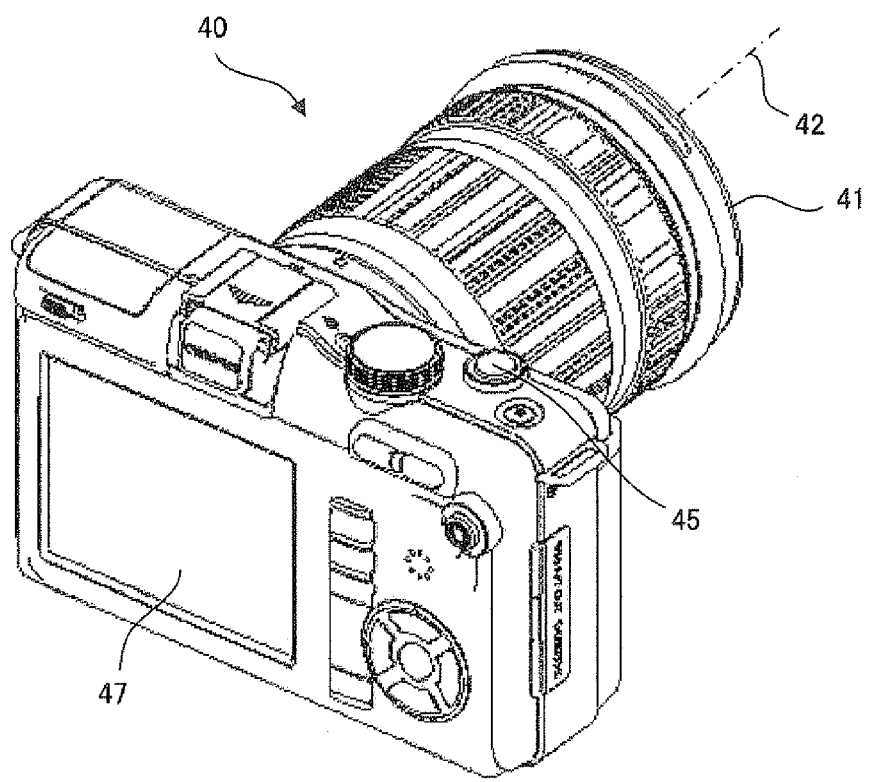
FIG. 15 is a perspective view showing the rear appearance of the digital camera according to the present embodiment.

FIGS. 14 and 15 are conceptual diagrams showing the configuration of an image pickup device of the present embodiment, in which a lens system is incorporated into an image pickup optical system 41. FIG. 14 is a perspective view showing the front appearance of a digital camera 40, which is an image pickup device. FIG. 15 is a perspective view showing a back surface thereof.

The digital camera 40 of the present embodiment includes the image pickup optical system 41, which is positioned on an image pickup optical path 42; a shutter button 45; an liquid crystal display monitor 47; and the like. In response to an operation of pushing the shutter button 45, which is disposed on an upper portion of the digital camera 40, an image is taken through the image pickup optical system 41, which is for example the lens system of Example 1. An image of object formed by the image pickup optical system 41 is formed on an image pickup element (photoelectric conversion plane), which is provided in the vicinity of an image formation plane. The object's image whose light is received by the image pickup element is displayed by a processing means on the liquid crystal display monitor 47 provided on the back surface of the camera as an electronic image. Moreover, the electronic image taken can be recorded by a recording means.

Figure 16:
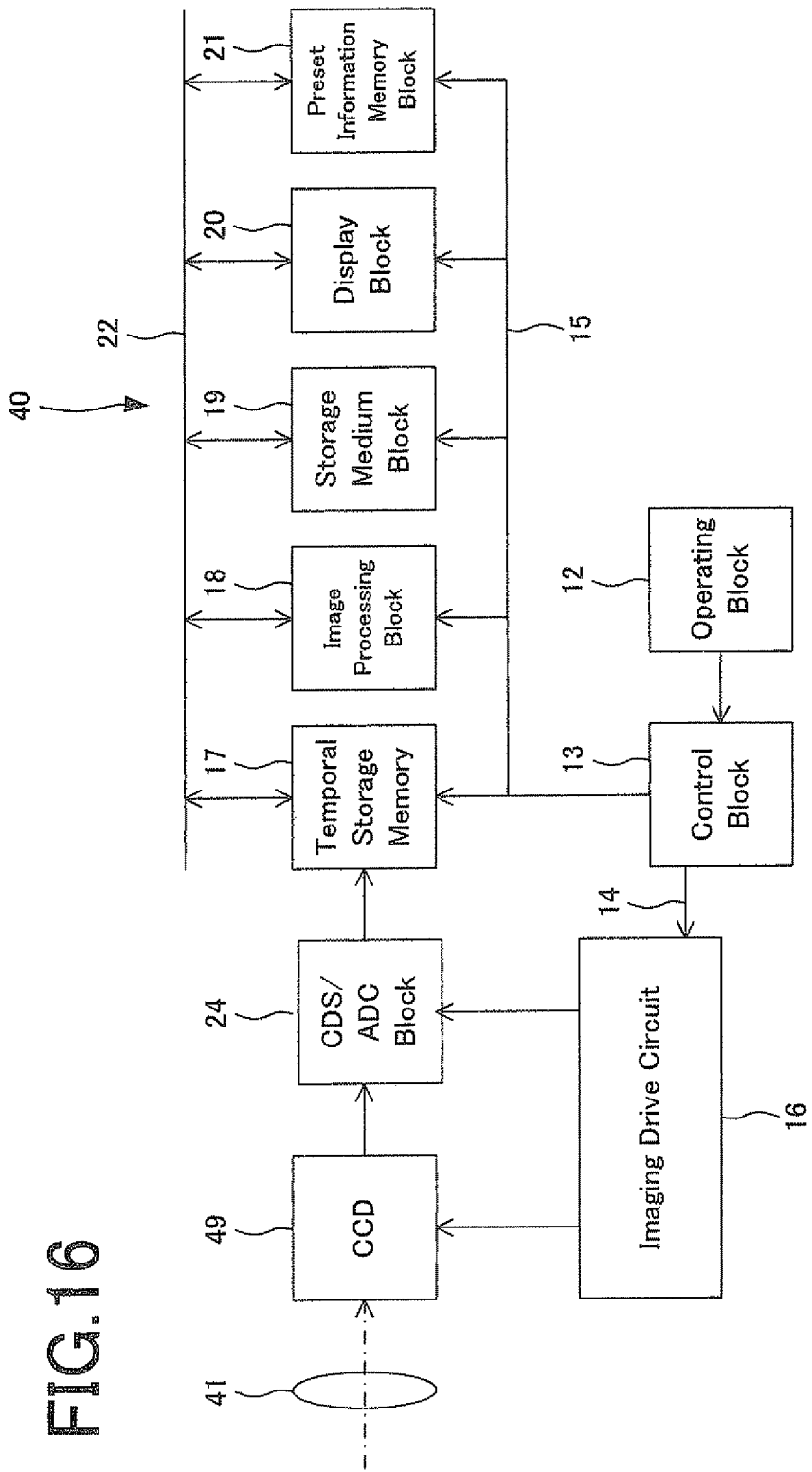
FIG. 16 is a block diagram showing the control configuration of the digital camera according to the present embodiment.

FIG. 16 is a block diagram showing internal circuits of a major portion of the digital camera 40 of the present embodiment.

As shown in FIG. 16, the digital camera 40 includes an operation unit 12; a control unit 13, which is connected to the operation unit 12; and an image pickup driving circuit 16, temporary storage memory 17, image processing unit 18, storage medium unit 19, display unit 20 and setting information storage memory unit 21, which are connected to control signal output ports of the control unit 13 via buses 14 and 15.

The inputting and outputting of data is possible between the above temporary storage memory 17, image processing unit 18, storage medium unit 19, display unit 20 and setting information storage memory unit 21 via a bus 22. To the image pickup driving circuit 16, a CCD 49 and the CDS/ADC unit 24 are connected.

The operation unit 12 includes various input buttons and switches, and notifies the control unit of event information, which is input from the outside (by a user of the camera) via the buttons and switches. The control unit 13 is for example a central processing unit such as CPU, and includes a built-in program memory, which is not shown in the diagram. The control unit 13 takes overall control of the digital camera 40 in accordance with a program stored in the program memory.

The CCD 49 is an image pickup element that is driven and controlled by the image pickup driving circuit 16, converts the amount of light per pixel of an object's image formed via the image pickup optical system 41 to electric signals, and outputs the electric signals to the CDS/ADC unit 24.

The CDS/ADC unit 24 is a circuit that amplifies the electric signals input from the CCD 49, and performs analog/digital conversion, and outputs image raw data (Bayer data; referred to as RAW data, hereinafter), on which only the amplification and digital conversion have been performed, to the temporary storage memory 17.

The temporary storage memory 17 is for example a buffer such as SDRAM, and a memory device that temporarily stores RAW data output from the CDS/ADC unit 24. The image processing unit 18 is a circuit that reads RAW data stored in the temporary storage memory 17 or RAW data stored in the storage medium unit 19, and electrically performs various kinds of image processing, including distortion aberration correction, on the basis of an image quality parameter specified by the control unit 13.

For example, a storage medium of a card or stick type, such as a flash memory, can be freely attached to and removed from the storage medium unit 19. The RAW data transferred from the temporary storage memory 17, and the image data on which image processing has been performed by the image processing unit 18 are recorded and retained in such a flash memory.

The display unit 20 is made up of the liquid crystal display monitor 47 and the like. On the display unit 20, the taken RAW data, the image data, operation menus and the like are displayed. The setting information storage memory unit 21 includes a ROM unit, in which various image quality parameters are stored in advance; and a RAM unit, in which the image quality parameters read by an input operation of the operation unit 12 from the ROM unit are stored.

The digital camera 40 having the above configuration employs a lens system of the present invention as the image pickup optical system 41. Therefore, the digital camera 40 can serve as an image pickup device that is small in size and suitable for taking a moving image.

The above has described various embodiments of the present invention. However, the present invention is not limited to the embodiments. An embodiment in which the configurations of the above embodiments are appropriately combined and formed is also within the scope of the present invention.

What is claimed is:

1. A lens system, from an object side to an image side in the following order, comprising:
    a fixed object-side lens group that is disposed closest to the object side;
    a first focusing lens group that moves during a focusing operation and includes a plurality of lenses;
    a second focusing lens group that moves during a focusing operation and includes a plurality of lenses;
    a wobbling lens group that has a smaller thickness on an optical axis than the thickness on the optical axis of the first focusing lens group and the thickness on the optical axis of the second focusing lens group, and vibrates by repeated back-and-forth movement on the optical axis; and
    a fixed image-side lens group that is disposed closest to the image side.

2. The lens system according to claim 1, wherein the following conditional expression (1) is satisfied:

$$0.03 < Dwob/(DF1+DF2) < 0.15 \quad (1)$$

where
Dwob is the thickness on the optical axis of the wobbling lens group,
DF1 is the thickness on the optical axis of the first focusing lens group, and
DF2 is the thickness on the optical axis of the second focusing lens group.

3. The lens system according to claim 1, wherein
the object-side lens group has positive refractive power,
the first focusing lens group has negative refractive power,
the second focusing lens group has positive refractive power, and
the following conditional expressions (2) and (3) are satisfied:

$$-0.78 < fF1/fobj < -0.4 \quad (2)$$

$$-1.3 < fF1/fF2 < -0.80 \quad (3)$$

where
fobj is a focal distance of the object-side lens group,
fF1 is a focal distance of the first focusing lens group, and
fF2 is a focal distance of the second focusing lens group.

4. The lens system according to claim 1, wherein
the following conditional expressions (4) and (5) are satisfied:

$$|(100\times(y1'-y1)/y1)|<0.107 \quad (4)$$

$$|(100\times(y0.7'-y0.7)/y0.7)|<0.107 \quad (5)$$

where y1 is a maximum height of image on an image plane,
y0.7 is 0.7 times the maximum height of image y1,
y1' is a light-beam height at a location where a main light beam having the same angle of view as an image-taking angle of view, which extends to the image height y1 during a focused-at-infinity period, crosses the image plane at a time when a defocus amount of Δs has occurred since the focused-at-infinity period as the wobbling lens group moves relative to an object at infinity,
y0.7' is a light-beam height at a location where a main light beam having the same angle of view as an image-taking angle of view, which extends to the image height y0.7 during a focused-at-infinity period, crosses the image plane at a time when a defocus amount of Δs has occurred since the focused-at-infinity period as the wobbling lens group moves relative to an object at infinity,
Δs is 8*the maximum height of image y1/1000, and
y1, y0.7, y1', y0.7' and Δs are all measured in millimeters.

5. The lens system according to claim 1, wherein
the object-side lens group has positive refractive power,
the first focusing lens group has negative refractive power,
the second focusing lens group has positive refractive power,
the wobbling lens group has negative refractive power,
a lateral magnification in the wobbling lens group is greater than 1, and
the following conditional expressions (6), (7) and (8) are satisfied:

$$0.48<fobj/finf<0.8 \quad (6)$$

$$0.4<fF2/finf<0.5 \quad (7)$$

$$0.2<|fwob|/finf<2.5 \quad (8)$$

where
fobj is a focal distance of the object-side lens group,
fF2 is a focal distance of the second focusing lens group,
fwob is a focal distance of the wobbling lens group, and
finf is a focal distance of the lens system during a focused-at-infinity period.

6. The lens system according to claim 1, wherein
the object-side lens group has positive refractive power, and contains three positive lenses and one negative lens.

7. The lens system according to claim 1, wherein
the image-side lens group only includes a single lens having positive refractive power.

8. The lens system according to claim 1, wherein
there are only two fixed lens groups, which are the object-side lens group and the image-side lens group.

9. The lens system according to claim 1, wherein
the first focusing lens group has negative refractive power, and only includes three lenses, which are one positive lens and two negative lenses.

10. The lens system according to claim 1, wherein
the second focusing lens group has positive refractive power, and only includes three lenses, which are two positive lenses and one negative lens.

11. The lens system according to claim 1, wherein
the wobbling lens group is a single lens having negative refractive power.

12. The lens system according to claim 1, wherein:
the object-side lens group has positive refractive power;
the first focusing lens group has negative refractive power;
the second focusing lens group has positive refractive power;
the wobbling lens group has negative refractive power;
the image-side lens group has positive refractive power;
the second focusing lens group is disposed closer to the image side than the first focusing lens group;
the wobbling lens group is disposed closer to the image side than the second focusing lens group;
an aperture diaphragm is disposed between the first focusing lens group and the second focusing lens group; and
when focusing is carried out from a remote distance to a short distance, the first focusing lens group moves to the image side, and the second focusing lens group moves to the object side.

13. The lens system according to claim 12, wherein
the lens system substantially includes, from the object side in the following order, the object-side lens group, the first focusing lens group, the second focusing lens group, the wobbling lens group, and the image-side lens group.

14. The lens system according to claim 12, wherein
the position of the aperture diaphragm is fixed between the first focusing lens group and the second focusing lens group, and
the following conditional expression (9) is satisfied:

$$0.2<|M1f|/|M2F|<2.0 \quad (9)$$

where
M1F is a maximum traveling distance of the first focusing lens group, and
M2F is a maximum traveling distance of the second focusing lens group.

15. The lens system according to claim 12, wherein
the following conditional expression (10) is satisfied:

$$0.003<|Mwob|/(M1F|+M2F|)<0.1 \quad (10)$$

where
M1F is a maximum traveling distance of the first focusing lens group,
M2F is a maximum traveling distance of the second focusing lens group, and
Mwob is a maximum traveling distance of the wobbling lens group.

16. The lens system according to claim 1, wherein
the following conditional expression (11) is satisfied:

$$0.09<Lbf/Ltotal<0.2 \quad (11)$$

where
Lbf is a distance on an optical axis from a lens surface closest to the image side to the image plane in air of the lens system,
Ltotal is Llens+Lbf, and
Llens is a distance on the optical axis from a lens surface closest to the object side to a lens surface closest to the image side in the lens system.

17. The lens system according to claim 1, wherein
the focus driving of the wobbling lens group is not performed at the time of focusing, and only the wobbling of the wobbling lens group is carried out.

18. The lens system according to claim 1, wherein:
during a focusing operation, the first focusing lens group and the second focusing lens group move in such a way that a focus state approaches a peak; and the wobbling lens group then moves in a way that further approaches the peak of the focus state.

19. The lens system according to claim 1, wherein a movement pitch of the image plane associated with the movement of the wobbling lens group is smaller than a movement pitch of the image plane associated with the movement of the first focusing lens group, and smaller than a movement pitch of the image plane associated with the movement of the second focusing lens group.

20. The lens system according to claim 1, wherein the image-side lens group is one cemented lens.

21. The lens system according to claim 1, wherein the image-side lens group is one lens.

22. An image pickup device, comprising:
the lens system claimed in claim 1; and
an image pickup device main unit that is disposed on an image side of the lens system and includes an image pickup element having an image pickup plane, which receives the light of an image from the lens system, wherein
the lens system satisfies the following conditional expression (12):

$$0.3 \leq |\beta max| \leq 1.7 \quad (12)$$

where
βmax is a maximum lateral magnification of the lens system that can be focused at short range.

23. The lens system according to claim 1, wherein distances or directions by which the first and second focusing lens groups move during the focusing operation are determined in consideration of the vibration of the wobbling lens group.

* * * * *